United States Patent
Lu et al.

(10) Patent No.: US 12,237,954 B2
(45) Date of Patent: Feb. 25, 2025

(54) DATA ENCODING METHOD, DATA DECODING METHOD, AND COMMUNICATION APPARATUS

(71) Applicant: HUAWEI TECHNOLOGIES CO., LTD., Guangdong (CN)

(72) Inventors: Yuchun Lu, Beijing (CN); Lin Ma, Shenzhen (CN); Liang Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 18/188,251

(22) Filed: Mar. 22, 2023

(65) Prior Publication Data
US 2023/0224194 A1 Jul. 13, 2023

Related U.S. Application Data

(63) Continuation of application No. PCT/CN2021/118074, filed on Sep. 13, 2021.

(30) Foreign Application Priority Data

Sep. 24, 2020 (CN) .......................... 202011019513.9

(51) Int. Cl.
*H04L 25/49* (2006.01)
*H04L 25/06* (2006.01)

(52) U.S. Cl.
CPC .......... *H04L 25/4917* (2013.01); *H04L 25/06* (2013.01)

(58) Field of Classification Search
CPC ... H04L 25/4917; H04L 25/06; H04L 1/0061; H04L 1/00; H04L 25/4908; H04L 1/0009; H04L 1/0003; H04L 1/0006
See application file for complete search history.

(56) References Cited

U.S. PATENT DOCUMENTS

| | | | |
|---|---|---|---|
| 6,718,139 B1 * | 4/2004 | Finan | H04Q 11/0067 398/79 |
| 10,644,834 B1 | 5/2020 | McClellan et al. | |
| 2009/0034522 A1 * | 2/2009 | Hayes | H04L 12/46 370/389 |
| 2015/0229329 A1 | 8/2015 | Yamada et al. | |

FOREIGN PATENT DOCUMENTS

| | | |
|---|---|---|
| CN | 105406937 A | 3/2016 |
| CN | 106341207 A | 1/2017 |
| CN | 111385058 A | 7/2020 |
| CN | 111669250 A | 9/2020 |

OTHER PUBLICATIONS

International Search Report and Written Opinion in International Appln. No. PCT/CN2021/118074, mailed on Nov. 25, 2021, 15 pages (with English translation).

* cited by examiner

*Primary Examiner* — Vineeta S Panwalkar
(74) *Attorney, Agent, or Firm* — Fish & Richardson P.C.

(57) ABSTRACT

This application discloses example data encoding methods, data decoding methods, and communication apparatuses. One example data encoding method includes generating M encoding units and distributing the M encoding units to N transmission channels. The M encoding units are obtained by encoding L frames. The M encoding units include at least one first-type unit. A first-type unit of the at least one first-type unit includes a first identifier. The first identifier indicates a start location that is in the first-type unit and that is of a frame header of a first frame in the L frames. M, N, and L are integers greater than or equal to 1.

16 Claims, 33 Drawing Sheets

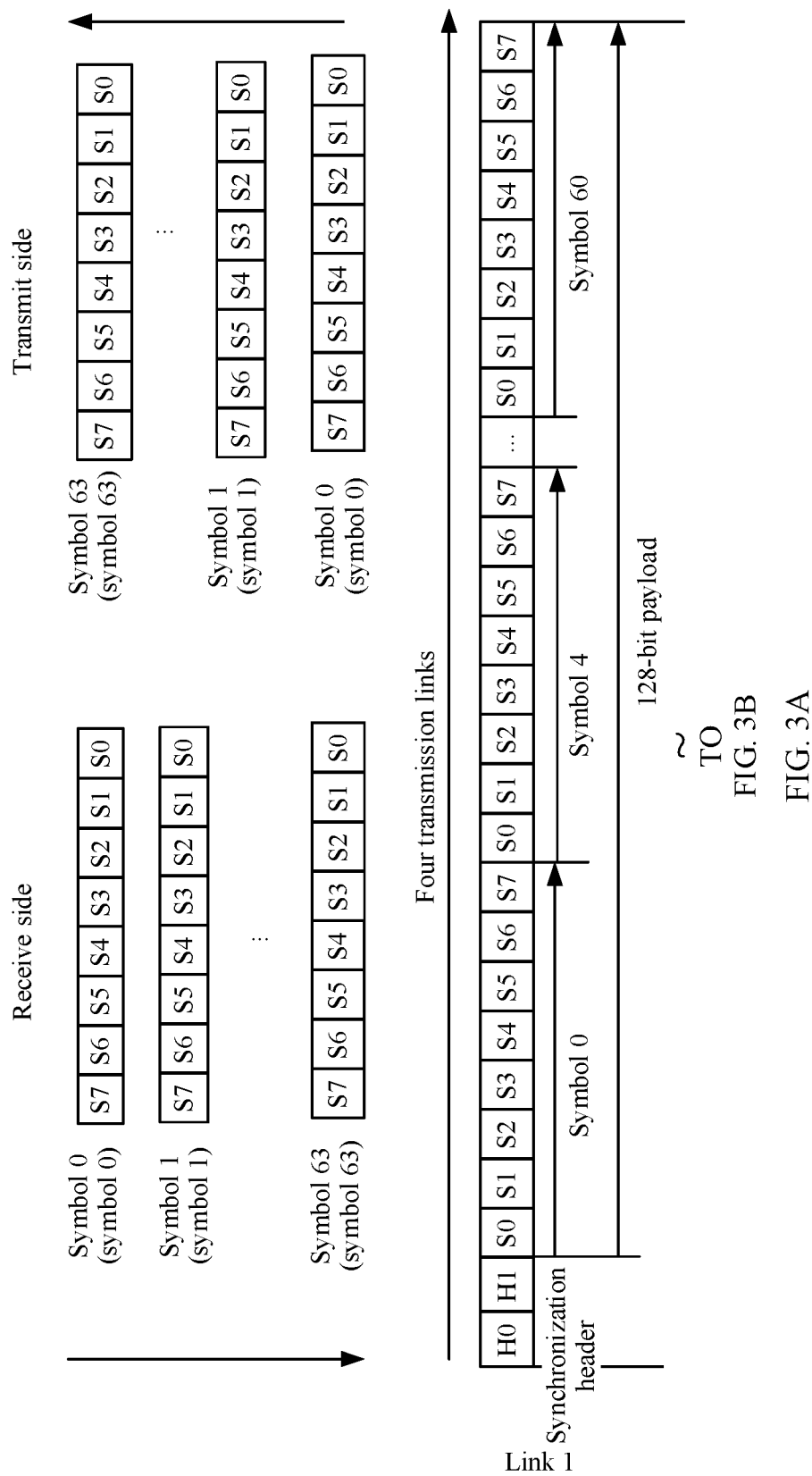

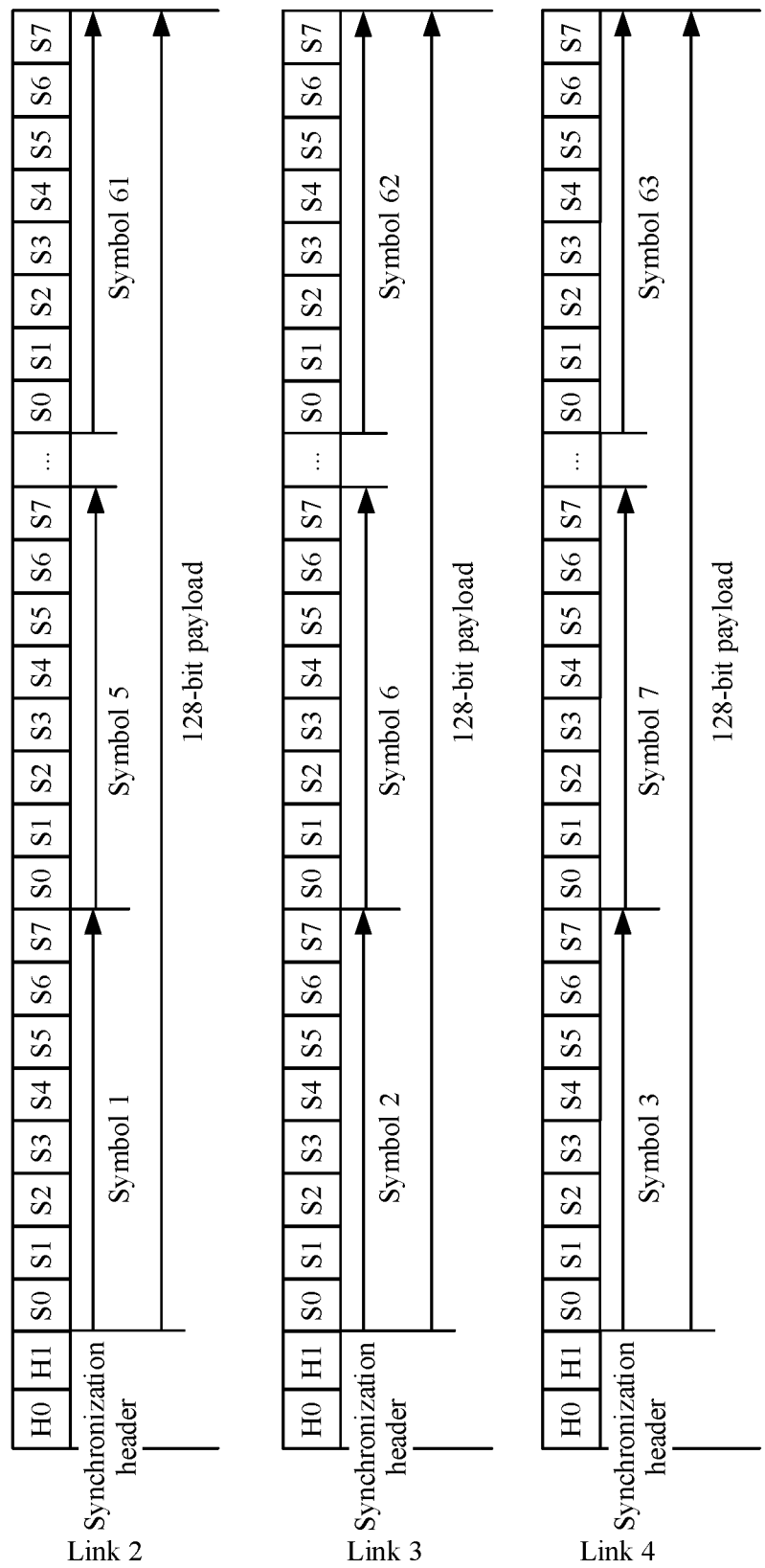

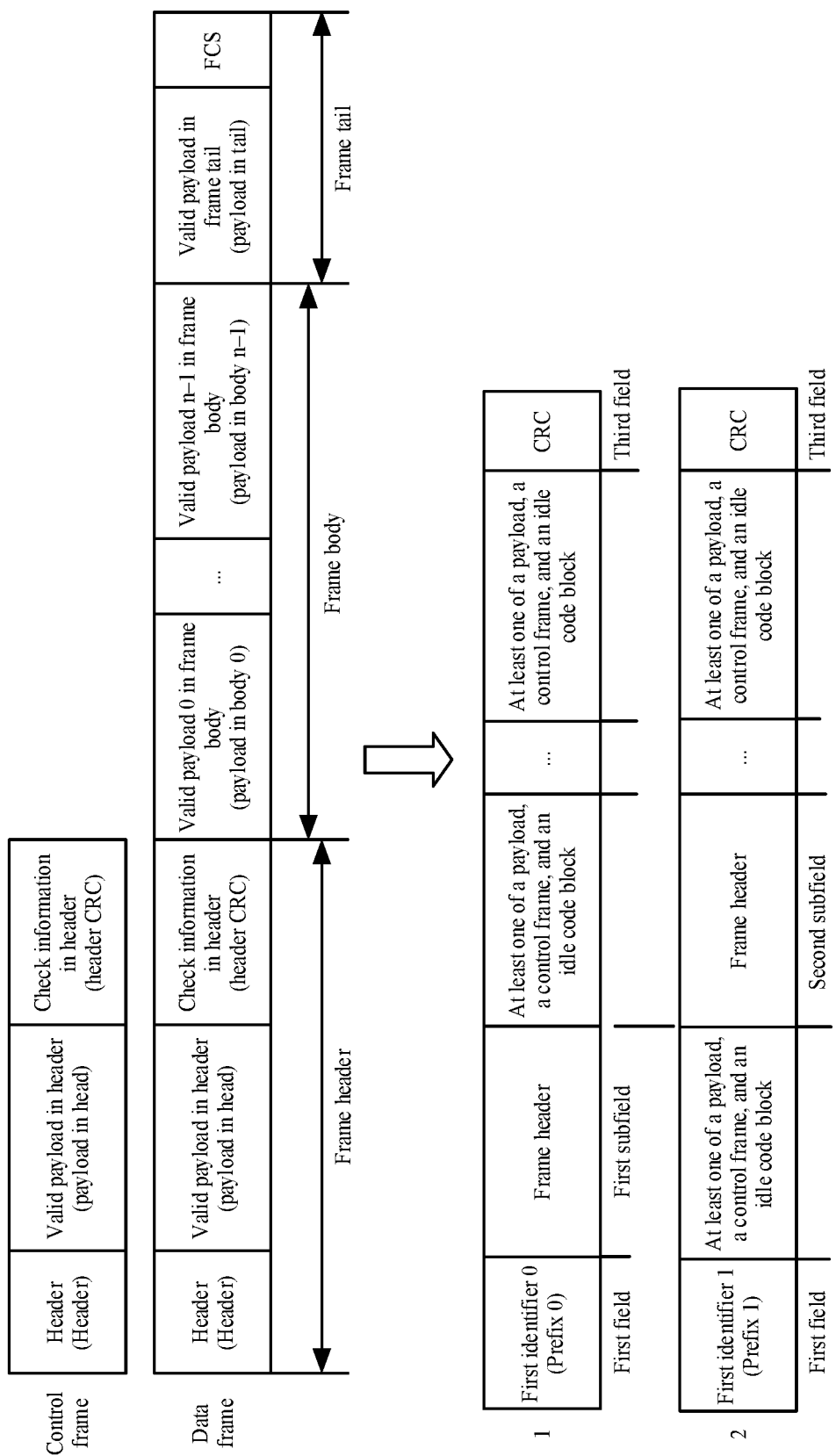

FIG. 6B (CONT. FROM FIG. 6A)

CONT.
FROM
FIG. 7A

Second-type unit 2

| At least one of a valid payload, a control frame, and space | At least one of a valid payload, a control frame, and space | At least one of a valid payload, a control frame, and space | At least one of a valid payload, a control frame, and space | ... | CRC |
|---|---|---|---|---|---|
| | | Third subfield | | | Third field |

First-type unit 2

| First identifier 1 (Prefix 1) | At least one of a valid payload, a control frame, and space | ... | At least one of a valid payload, a control frame, and space | Frame header | CRC |
|---|---|---|---|---|---|
| First field | | | | $K^{th}$ subfield | Third field |

First-type unit 3

| First identifier 2 (Prefix 2) | At least one of a valid payload, a control frame, and space | ... | Frame header | At least one of a valid payload, a control frame, and space | CRC |
|---|---|---|---|---|---|
| First field | | | | $K^{th}$ subfield | Third field |

FIG. 7B

CONT.
FROM
FIG. 9A

| | | | | | |
|---|---|---|---|---|---|
| 3 | First identifier 2 (Prefix 2) | At least one of a payload, a control frame, check information in frame tail, and an idle code block | At least one of a payload, a control frame, check information in frame tail, and an idle code block | Frame header | ... |
| | First field | | | Third subfield | |
| 4 | First identifier 3 (Prefix 3) | At least one of a payload, a control frame, check information in frame tail, and an idle code block | ... | At least one of a payload, a control frame, check information in frame tail, and an idle code block | Frame header |
| | First field | | | | $K^{th}$ subfield |
| 5 | First identifier 4 (Prefix 4) | At least one of a payload, a control frame, check information in frame tail, and an idle code block | ... | At least one of a payload, a control frame, check information in frame tail, and an idle code block | At least one of a payload, a control frame, check information in frame tail, and an idle code block |
| | First field | | | | $K^{th}$ subfield |

FIG. 9B

CONT.
FROM
FIG. 10A

Second-type unit 2

| | At least one of a payload and check information in frame tail | At least one of a payload, a control frame, check information in frame tail, and an idle code block | At least one of a payload, a control frame, check information in frame tail, and an idle code block | Frame header | ... |
|---|---|---|---|---|---|
| 3 | | | | | |
| | First field | | | Third subfield | |

First-type unit 2

| | First identifier 3 (Prefix 3) | At least one of a payload, a control frame, check information in frame tail, and an idle code block | ... | At least one of a payload, a control frame, check information in frame tail, and an idle code block | Frame header |
|---|---|---|---|---|---|
| 4 | | | | | |
| | First field | | | | $K^{th}$ subfield |

First-type unit 3

| | First identifier 4 (Prefix 4) | At least one of a payload, a control frame, check information in frame tail, and an idle code block | ... | At least one of a payload, a control frame, check information in frame tail, and an idle code block | At least one of a payload, a control frame, check information in frame tail, and an idle code block |
|---|---|---|---|---|---|
| 5 | | | | | |
| | First field | | | | $K^{th}$ subfield |

CONT.
FROM
FIG. 12A

| | First identifier 2 (Prefix 2) | At least one of a payload, a control frame, and an idle code block | At least one of a payload, a control frame, and an idle code block | Frame header | ... |
|---|---|---|---|---|---|
| 3 | | | | | |
| | First field | | | Third subfield | $K^{th}$ subfield |

| | First identifier 3 (Prefix 3) | At least one of a payload, a control frame, and an idle code block | ... | At least one of a payload, a control frame, and an idle code block | Frame header | Payload |
|---|---|---|---|---|---|---|
| 4 | | | | | | |
| | First field | | | | | $K^{th}$ subfield |

| | First identifier 4 (Prefix 4) | At least one of a payload, a control frame, and an idle code block | ... | At least one of a payload, a control frame, and an idle code block | At least one of a payload, a control frame, and an idle code block |
|---|---|---|---|---|---|
| 5 | | | | | |
| | First field | | | | $K^{th}$ subfield |

FIG. 12B

CONT.
FROM
FIG. 14A

Second-type unit 2

| | | | | | |
|---|---|---|---|---|---|
| 3 | At least one of a payload and check information in frame tail | At least one of a payload, a control frame, check information in frame tail, and an idle code block | At least one of a payload, a control frame, check information in frame tail, and an idle code block | Frame header | ... |
| | First field | | | Third subfield | |

First-type unit 2

| | | | | | |
|---|---|---|---|---|---|
| 4 | First identifier 3 (Prefix 3) | At least one of a payload, a control frame, check information in frame tail, and an idle code block | ... | At least one of a payload, a control frame, check information in frame tail, and an idle code block | Frame header |
| | First field | | | | $K^{th}$ subfield |

First-type unit 3

| | | | | | |
|---|---|---|---|---|---|
| 5 | First identifier 4 (Prefix 4) | At least one of a payload, a control frame, check information in frame tail, and an idle code block | ... | At least one of a payload, a control frame, check information in frame tail, and an idle code block | At least one of a payload, a control frame, check information in frame tail, and an idle code block |
| | First field | | | | $K^{th}$ subfield |

FIG. 14B

| | | | | | | | | | | | | | | | |
|---|---|---|---|---|---|---|---|---|---|---|---|---|---|---|---|
| 0 | First identifier A | A0 | A1 | A2 | A3 | A4 | A5 | A6 | A7 | A8 | A9 | A10 | A11 | A12 | A13 |
| 1 | A14 | A15 | A16 | A17 | A18 | A19 | A20 | A21 | A22 | A23 | A24 | A25 | A26 | A27 | A28 | A29 |
| 2 | A30 | A31 | A32 | A33 | A34 | A35 | A36 | A37 | A38 | A39 | A40 | A41 | A42 | A43 | A44 | A45 |
| 3 | A46 | A47 | A48 | A49 | A50 | A51 | A52 | A53 | A54 | A55 | A56 | A57 | A58 | A59 | A60 | A61 |
| 4 | A62 | A63 | A64 | A65 | First identifier B | B0 | B1 | B2 | B3 | B4 | B5 | B6 | B7 | B8 | B9 |
| 5 | B10 | B11 | B12 | B13 | B14 | B15 | B16 | B17 | B18 | B19 | B20 | B21 | B22 | B23 | B24 | B25 |
| 6 | B26 | B27 | B28 | B29 | B30 | B31 | B32 | B33 | B34 | B35 | B36 | B37 | B38 | B39 | B40 | B41 |
| 7 | B42 | B43 | B44 | B45 | B46 | B47 | B48 | B49 | B50 | B51 | B52 | B53 | B54 | B55 | B56 | B57 |
| 8 | B58 | B59 | B60 | B61 | B62 | B63 | B64 | B65 | First identifier C | C0 | C1 | C2 | C3 | C4 | C5 |
| 9 | C6 | C7 | C8 | C9 | C10 | C11 | C12 | C13 | C14 | C15 | C16 | C17 | C18 | C19 | C20 | C21 |
| 10 | C22 | C23 | C24 | C25 | C26 | C27 | C28 | C29 | C30 | C31 | C32 | C33 | C34 | C35 | C36 | C37 |
| 11 | C38 | C39 | C40 | C41 | C42 | C43 | C44 | C45 | C46 | C47 | C48 | C49 | C50 | C51 | C52 | C53 |
| 12 | C54 | C55 | C56 | C57 | C58 | C59 | C60 | C61 | C62 | C63 | C64 | C65 | First identifier D | D0 | D1 |
| 13 | D2 | D3 | D4 | D5 | D6 | D7 | D8 | D9 | D10 | D11 | D12 | D13 | D14 | D15 | D16 | D17 |
| 14 | D18 | D19 | D20 | D21 | D22 | D23 | D24 | D25 | D26 | D27 | D28 | D29 | D30 | D31 | D32 | D33 |
| 15 | D34 | D35 | D36 | D37 | D38 | D39 | D40 | D41 | D42 | D43 | D44 | D45 | D46 | D47 | D48 | D49 |
| 16 | D50 | D51 | D52 | D53 | D54 | D55 | D56 | D57 | D58 | D59 | D60 | D61 | D62 | D63 | D64 | D65 |

First distribution rule in a first round

FIG. 15

Second distribution rule in a second round:

| | | | | | | | | | | | | | | | | |
|---|---|---|---|---|---|---|---|---|---|---|---|---|---|---|---|---|
| 0 | E0 | E1 | First identifier E | E4 | E5 | E2 | E3 | E8 | E9 | E6 | E7 | E12 | E13 | E10 | E11 |
| 1 | E16 | E17 | E14 | E15 | E20 | E21 | E18 | E19 | E24 | E25 | E22 | E23 | E28 | E29 | E26 | E27 |
| 2 | E32 | E33 | E30 | E31 | E36 | E37 | E34 | E35 | E40 | E41 | E38 | E39 | E44 | E45 | E42 | E43 |
| 3 | E48 | E49 | E46 | E47 | E52 | E53 | E50 | E51 | E56 | E57 | E54 | E55 | E60 | E61 | E58 | E59 |
| 4 | E64 | E65 | E62 | E63 | F0 | F1 | First identifier F | F4 | F5 | F2 | F3 | F8 | F9 | F6 | F7 |
| 5 | F12 | F13 | F10 | F11 | F16 | F17 | F14 | F15 | F20 | F21 | F18 | F19 | F24 | F25 | F22 | F23 |
| 6 | F28 | F29 | F26 | F27 | F32 | F33 | F30 | F31 | F36 | F37 | F34 | F35 | F40 | F41 | F38 | F39 |
| 7 | F44 | F45 | F42 | F43 | F48 | F49 | F46 | F47 | F52 | F53 | F50 | F51 | F56 | F57 | F54 | F55 |
| 8 | F60 | F61 | F58 | F59 | F64 | F65 | F62 | F63 | G0 | G1 | First identifier G | G4 | G5 | G2 | G3 |
| 9 | G8 | G9 | G6 | G7 | G12 | G13 | G10 | G11 | G16 | G17 | G14 | G15 | G20 | G21 | G18 | G19 |
| 10 | G24 | G25 | G22 | G23 | G28 | G29 | G26 | G27 | G32 | G33 | G30 | G31 | G36 | G37 | G34 | G35 |
| 11 | G40 | G41 | G38 | G39 | G44 | G45 | G42 | G43 | G48 | G49 | G46 | G47 | G52 | G53 | G50 | G51 |
| 12 | G56 | G57 | G54 | G55 | G60 | G61 | G58 | G59 | G64 | G65 | G62 | G63 | H0 | H1 | First identifier H |
| 13 | H4 | H5 | H2 | H3 | H8 | H9 | H6 | H7 | H12 | H13 | H10 | H11 | H16 | H17 | H14 | H15 |
| 14 | H20 | H21 | H18 | H19 | H24 | H25 | H22 | H23 | H28 | H29 | H26 | H27 | H32 | H33 | H30 | H31 |
| 15 | H36 | H37 | H34 | H35 | H40 | H41 | H38 | H39 | H44 | H45 | H42 | H43 | H48 | H49 | H46 | H47 |
| 16 | H52 | H53 | H50 | H51 | H56 | H57 | H54 | H55 | H60 | H61 | H58 | H59 | H64 | H65 | H62 | H63 |

FIG. 15 (cont'd)

| 0 | First identifier I | I0 | I1 | I2 | I3 | I4 | I5 | I6 | I7 | I8 | I9 | I10 | I11 | I12 | I13 |
|---|---|---|---|---|---|---|---|---|---|---|---|---|---|---|---|
| 1 | I14 | I15 | I16 | I17 | I18 | I19 | I20 | I21 | I22 | I23 | I24 | I25 | I26 | I27 | I28 | I29 |
| 2 | I30 | I31 | I32 | I33 | I34 | I35 | I36 | I37 | I38 | I39 | I40 | I41 | I42 | I43 | I44 | I45 |

| | | 0 | 1 | 2 | 3 | 4 | 5 | 6 | 7 | 8 | 9 | 10 | 11 |
|---|---|---|---|---|---|---|---|---|---|---|---|---|---|
| First distribution rule in a first round | 0 | First identifier A | A0 | A1 | A2 | A3 | A4 | A5 | A6 | A7 | A8 | A9 |
| | 1 | A10 | A11 | A12 | A13 | A14 | A15 | A16 | A17 | A18 | A19 | A20 | A21 |
| | 2 | A22 | A23 | A24 | A25 | A26 | A27 | A28 | A29 | A30 | A31 | A32 | A33 |
| | 3 | A34 | A35 | A36 | A37 | A38 | A39 | A40 | A41 | A42 | A43 | A44 | A45 |
| | 4 | A46 | A47 | A48 | A49 | A50 | A51 | A52 | A53 | A54 | A55 | A56 | A57 |
| | 5 | A58 | A59 | A60 | A61 | A62 | A63 | A64 | A65 | First identifier B | B0 | B1 |
| | 6 | B2 | B3 | B4 | B5 | B6 | B7 | B8 | B9 | B10 | B11 | B12 | B13 |
| | 7 | B14 | B15 | B16 | B17 | B18 | B19 | B20 | B21 | B22 | B23 | B24 | B25 |
| | 8 | B26 | B27 | B28 | B29 | B30 | B31 | B32 | B33 | B34 | B35 | B36 | B37 |
| | 9 | B38 | B39 | B40 | B41 | B42 | B43 | B44 | B45 | B46 | B47 | B48 | B49 |
| | 10 | B50 | B51 | B52 | B53 | B54 | B55 | B56 | B57 | B58 | B59 | B60 | B61 |
| | 11 | B62 | B63 | B64 | B65 | First identifier C | C0 | C1 | C2 | C3 | C4 | C5 |
| | 12 | C6 | C7 | C8 | C9 | C10 | C11 | C12 | C13 | C14 | C15 | C16 | C17 |
| | 13 | C18 | C19 | C20 | C21 | C22 | C23 | C24 | C25 | C26 | C27 | C28 | C29 |
| | 14 | C30 | C31 | C32 | C33 | C34 | C35 | C36 | C37 | C38 | C39 | C40 | C41 |
| | 15 | C42 | C43 | C44 | C45 | C46 | C47 | C48 | C49 | C50 | C51 | C52 | C53 |
| | 16 | C54 | C55 | C56 | C57 | C58 | C59 | C60 | C61 | C62 | C63 | C64 | C65 |

| | | | | | | | | | | | |
|---|---|---|---|---|---|---|---|---|---|---|---|
| | 0 | D0 | D1 | First identifier D | | D4 | D5 | D2 | D3 | D8 | D9 | D6 | D7 |

| | | | | | | | | | | | | |
|---|---|---|---|---|---|---|---|---|---|---|---|---|
| | 0 | D0 | D1 | First identifier D | | D4 | D5 | D2 | D3 | D8 | D9 | D6 | D7 |
| | 1 | D12 | D13 | D10 | D11 | D16 | D17 | D14 | D15 | D20 | D21 | D18 | D19 |
| Second distribution rule in a second round | 2 | D24 | D25 | D22 | D23 | D28 | D29 | D26 | D27 | D32 | D33 | D30 | D31 |
| | 3 | D36 | D37 | D34 | D35 | D40 | D41 | D38 | D39 | D44 | D45 | D42 | D43 |
| | 4 | D48 | D49 | D46 | D47 | D52 | D53 | D50 | D51 | D56 | D57 | D54 | D55 |
| | 5 | D60 | D61 | D58 | D59 | D64 | D65 | D62 | D63 | E0 | E1 | First identifier E | |
| | 6 | E4 | E5 | E2 | E3 | E8 | E9 | E6 | E7 | E12 | E13 | E10 | E11 |
| | 7 | E16 | E17 | E14 | E15 | E20 | E21 | E18 | E19 | E24 | E25 | E22 | E23 |
| | 8 | E28 | E29 | E26 | E27 | E32 | E33 | E30 | E31 | E36 | E37 | E34 | E35 |
| | 9 | E40 | E41 | E38 | E39 | E44 | E45 | E42 | E43 | E48 | E49 | E46 | E47 |
| | 10 | E52 | E53 | E50 | E51 | E56 | E57 | E54 | E55 | E60 | E61 | E58 | E59 |
| | 11 | E64 | E65 | E62 | E63 | F0 | F1 | First identifier F | | F4 | F5 | F2 | F3 |
| | 12 | F8 | F9 | F6 | F7 | F12 | F13 | F10 | F11 | F16 | F17 | F14 | F15 |
| | 13 | F20 | F21 | F18 | F19 | F24 | F25 | F22 | F23 | F28 | F29 | F26 | F27 |
| | 14 | F32 | F33 | F30 | F31 | F36 | F37 | F34 | F35 | F40 | F41 | F38 | F39 |
| | 15 | F44 | F45 | F42 | F43 | F48 | F49 | F46 | F47 | F52 | F53 | F50 | F51 |
| | 16 | F56 | F57 | F54 | F55 | F60 | F61 | F58 | F59 | F64 | F65 | F62 | F63 |

FIG. 16 (cont'd)

| First distribution rule in a third round | 0 | First identifier G | G0 | G1 | G2 | G3 | G4 | G5 | G6 | G7 | G8 | G9 |
|---|---|---|---|---|---|---|---|---|---|---|---|---|
| | 1 | G10 | G11 | G12 | G13 | G14 | G15 | G16 | G17 | G18 | G19 | G20 | G21 |
| | 2 | G22 | G23 | G24 | G25 | G26 | G27 | G28 | G29 | G30 | G31 | G32 | G33 |
| | 3 | G34 | G35 | G36 | G37 | G38 | G39 | G40 | G41 | G42 | G43 | G44 | G45 |
| | 4 | G46 | G47 | G48 | G49 | G50 | G51 | G52 | G53 | G54 | G55 | G56 | G57 |
| | 5 | G58 | G59 | G60 | G61 | G62 | G63 | G64 | G65 | First identifier H | H0 | H1 |
| | 6 | H2 | H3 | H4 | H5 | H6 | H7 | H8 | H9 | H10 | H11 | H12 | H13 |
| | 7 | H14 | H15 | H16 | H17 | H18 | H19 | H20 | H21 | H22 | H23 | H24 | H25 |
| | 8 | H26 | H27 | H28 | H29 | H30 | H31 | H32 | H33 | H34 | H35 | H36 | H37 |
| | 9 | H38 | H39 | H40 | H41 | H42 | H43 | H44 | H45 | H46 | H47 | H48 | H49 |

FIG. 16 (cont'd)

<table>
<tr><th colspan="2"></th><th colspan="8">X8</th></tr>
<tr><th colspan="2"></th><th>0</th><th>1</th><th>2</th><th>3</th><th>4</th><th>5</th><th>6</th><th>7</th></tr>
<tr><td rowspan="17">First distribution rule in a first round</td><td>0</td><td>First identifier A</td><td>A0</td><td>A1</td><td>A2</td><td>A3</td><td>A4</td><td>A5</td></tr>
<tr><td>1</td><td>A6</td><td>A7</td><td>A8</td><td>A9</td><td>A10</td><td>A11</td><td>A12</td><td>A13</td></tr>
<tr><td>2</td><td>A14</td><td>A15</td><td>A16</td><td>A17</td><td>A18</td><td>A19</td><td>A20</td><td>A21</td></tr>
<tr><td>3</td><td>A22</td><td>A23</td><td>A24</td><td>A25</td><td>A26</td><td>A27</td><td>A28</td><td>A29</td></tr>
<tr><td>4</td><td>A30</td><td>A31</td><td>A32</td><td>A33</td><td>A34</td><td>A35</td><td>A36</td><td>A37</td></tr>
<tr><td>5</td><td>A38</td><td>A39</td><td>A40</td><td>A41</td><td>A42</td><td>A43</td><td>A44</td><td>A45</td></tr>
<tr><td>6</td><td>A46</td><td>A47</td><td>A48</td><td>A49</td><td>A50</td><td>A51</td><td>A52</td><td>A53</td></tr>
<tr><td>7</td><td>A54</td><td>A55</td><td>A56</td><td>A57</td><td>A58</td><td>A59</td><td>A60</td><td>A61</td></tr>
<tr><td>8</td><td>A62</td><td>A63</td><td>A64</td><td>A65</td><td>First identifier B</td><td>B0</td><td>B1</td></tr>
<tr><td>9</td><td>B2</td><td>B3</td><td>B4</td><td>B5</td><td>B6</td><td>B7</td><td>B8</td><td>B9</td></tr>
<tr><td>10</td><td>B10</td><td>B11</td><td>B12</td><td>B13</td><td>B14</td><td>B15</td><td>B16</td><td>B17</td></tr>
<tr><td>11</td><td>B18</td><td>B19</td><td>B20</td><td>B21</td><td>B22</td><td>B23</td><td>B24</td><td>B25</td></tr>
<tr><td>12</td><td>B26</td><td>B27</td><td>B28</td><td>B29</td><td>B30</td><td>B31</td><td>B32</td><td>B33</td></tr>
<tr><td>13</td><td>B34</td><td>B35</td><td>B36</td><td>B37</td><td>B38</td><td>B39</td><td>B40</td><td>B41</td></tr>
<tr><td>14</td><td>B42</td><td>B43</td><td>B44</td><td>B45</td><td>B46</td><td>B47</td><td>B48</td><td>B49</td></tr>
<tr><td>15</td><td>B50</td><td>B51</td><td>B52</td><td>B53</td><td>B54</td><td>B55</td><td>B56</td><td>B57</td></tr>
<tr><td>16</td><td>B58</td><td>B59</td><td>B60</td><td>B61</td><td>B62</td><td>B63</td><td>B64</td><td>B65</td></tr>
</table>

| | | | | | | | | |
|---|---|---|---|---|---|---|---|---|
| Second distribution rule in a second round | 17 | C0 | C1 | First identifier C | C4 | C5 | C2 | C3 |
| | 18 | C8 | C9 | C6 | C7 | C12 | C13 | C10 | C11 |
| | 19 | C16 | C17 | C14 | C15 | C20 | C21 | C18 | C19 |
| | 20 | C24 | C25 | C22 | C23 | C28 | C29 | C26 | C27 |
| | 21 | C32 | C33 | C30 | C31 | C36 | C37 | C34 | C35 |
| | 22 | C40 | C41 | C38 | C39 | C44 | C45 | C42 | C43 |
| | 23 | C48 | C49 | C46 | C47 | C52 | C53 | C50 | C51 |
| | 24 | C56 | C57 | C54 | C55 | C60 | C61 | C58 | C59 |
| | 25 | C64 | C65 | C62 | C63 | D0 | D1 | First identifier D | |
| | 26 | D4 | D5 | D2 | D3 | D8 | D9 | D6 | D7 |
| | 27 | D12 | D13 | D10 | D11 | D16 | D17 | D14 | D15 |
| | 28 | D20 | D21 | D18 | D19 | D24 | D25 | D22 | D23 |
| | 29 | D28 | D29 | D26 | D27 | D32 | D33 | D30 | D31 |
| | 30 | D36 | D37 | D34 | D35 | D40 | D41 | D38 | D39 |
| | 31 | D44 | D45 | D42 | D43 | D48 | D49 | D46 | D47 |
| | 32 | D52 | D53 | D50 | D51 | D56 | D57 | D54 | D55 |
| | 33 | D60 | D61 | D58 | D59 | D64 | D65 | D62 | D63 |
| First distribution rule in a third round | 0 | First identifier E | E0 | E1 | E2 | E3 | E4 | E5 |
| | 1 | E6 | E7 | E8 | E9 | E10 | E11 | E12 | E13 |
| | 2 | E14 | E15 | E16 | E17 | E18 | E19 | E20 | E21 |
| | 3 | E22 | E23 | E24 | E25 | E26 | E27 | E28 | E29 |
| | 4 | E30 | E31 | E32 | E33 | E34 | E35 | E36 | E37 |
| | 5 | E38 | E39 | E40 | E41 | E42 | E43 | E44 | E45 |
| | 6 | E46 | E47 | E48 | E49 | E50 | E51 | E52 | E53 |
| | 7 | E54 | E55 | E56 | E57 | E58 | E59 | E60 | E61 |
| | 8 | E62 | E63 | E64 | E65 | First identifier F | F0 | F1 |
| | 9 | F2 | F3 | F4 | F5 | F6 | F7 | F8 | F9 |

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | First identifier A | A0 | A1 | A2 | A3 | A4 | A5 | A6 | A7 | A8 | A9 | A10 | A11 | A12 | A13 | |
| 1 | A14 | A15 | A16 | A17 | A18 | A19 | A20 | A21 | A22 | A23 | A24 | A25 | A26 | A27 | A28 | A29 |
| 2 | A30 | A31 | A32 | A33 | A34 | A35 | A36 | A37 | A38 | A39 | A40 | A41 | A42 | A43 | A44 | A45 |
| 3 | A46 | A47 | A48 | A49 | A50 | A51 | A52 | A53 | A54 | A55 | A56 | A57 | A58 | A59 | A60 | A61 |
| 4 | A62 | A63 | First identifier B | B0 | B1 | B2 | B3 | B4 | B5 | B6 | B7 | B8 | B9 | B10 | B11 | |
| 5 | B12 | B13 | B14 | B15 | B16 | B17 | B18 | B19 | B20 | B21 | B22 | B23 | B24 | B25 | B26 | B27 |
| 6 | B28 | B29 | B30 | B31 | B32 | B33 | B34 | B35 | B36 | B37 | B38 | B39 | B40 | B41 | B42 | B43 |
| 7 | B44 | B45 | B46 | B47 | B48 | B49 | B50 | B51 | B52 | B53 | B54 | B55 | B56 | B57 | B58 | B59 |
| 8 | B60 | B61 | B62 | B63 | First identifier C | C0 | C1 | C2 | C3 | C4 | C5 | C6 | C7 | C8 | C9 | |
| 9 | C10 | C11 | C12 | C13 | C14 | C15 | C16 | C17 | C18 | C19 | C20 | C21 | C22 | C23 | C24 | C25 |
| 10 | C26 | C27 | C28 | C29 | C30 | C31 | C32 | C33 | C34 | C35 | C36 | C37 | C38 | C39 | C40 | C41 |
| 11 | C42 | C43 | C44 | C45 | C46 | C47 | C48 | C49 | C50 | C51 | C52 | C53 | C54 | C55 | C56 | C57 |
| 12 | C58 | C59 | C60 | C61 | C62 | C63 | First identifier D | D0 | D1 | D2 | D3 | D4 | D5 | D6 | D7 | |
| 13 | D8 | D9 | D10 | D11 | D12 | D13 | D14 | D15 | D16 | D17 | D18 | D19 | D20 | D21 | D22 | D23 |
| 14 | D24 | D25 | D26 | D27 | D28 | D29 | D30 | D31 | D32 | D33 | D34 | D35 | D36 | D37 | D38 | D39 |
| 15 | D40 | D41 | D42 | D43 | D44 | D45 | D46 | D47 | D48 | D49 | D50 | D51 | D52 | D53 | D54 | D55 |
| 16 | D56 | D57 | D58 | D59 | D60 | D61 | D62 | D63 | First identifier E | E0 | E1 | E2 | E3 | E4 | E5 | |

| | | | | | | | | | | | | | | | |
|---|---|---|---|---|---|---|---|---|---|---|---|---|---|---|---|
| 17 | E6 | E7 | E8 | E9 | E10 | E11 | E12 | E13 | E14 | E15 | E16 | E17 | E18 | E19 | E20 | E21 |
| 18 | E22 | E23 | E24 | E25 | E26 | E27 | E28 | E29 | E30 | E31 | E32 | E33 | E34 | E35 | E36 | E37 |
| 19 | E38 | E39 | E40 | E41 | E42 | E43 | E44 | E45 | E46 | E47 | E48 | E49 | E50 | E51 | E52 | E53 |
| 20 | E54 | E55 | E56 | E57 | E58 | E59 | E60 | E61 | E62 | E63 | First identifier F | F0 | F1 | F2 | F3 |
| 21 | F4 | F5 | F6 | F7 | F8 | F9 | F10 | F11 | F12 | F13 | F14 | F15 | F16 | F17 | F18 | F19 |
| 22 | F20 | F21 | F22 | F23 | F24 | F25 | F26 | F27 | F28 | F29 | F30 | F31 | F32 | F33 | F34 | F35 |
| 23 | F36 | F37 | F38 | F39 | F40 | F41 | F42 | F43 | F44 | F45 | F46 | F47 | F48 | F49 | F50 | F51 |
| 24 | F52 | F53 | F54 | F55 | F56 | F57 | F58 | F59 | F60 | F61 | F62 | F63 | First identifier G | G0 | G1 |
| 25 | G2 | G3 | G4 | G5 | G6 | G7 | G8 | G9 | G10 | G11 | G12 | G13 | G14 | G15 | G16 | G17 |
| 26 | G18 | G19 | G20 | G21 | G22 | G23 | G24 | G25 | G26 | G27 | G28 | G29 | G30 | G31 | G32 | G33 |
| 27 | G34 | G35 | G36 | G37 | G38 | G39 | G40 | G41 | G42 | G43 | G44 | G45 | G46 | G47 | G48 | G49 |
| 28 | G50 | G51 | G52 | G53 | G54 | G55 | G56 | G57 | G58 | G59 | G60 | G61 | G62 | G63 | First identifier H |
| 29 | H0 | H1 | H2 | H3 | H4 | H5 | H6 | H7 | H8 | H9 | H10 | H11 | H12 | H13 | H14 | H15 |
| 30 | H16 | H17 | H18 | H19 | H20 | H21 | H22 | H23 | H24 | H25 | H26 | H27 | H28 | H29 | H30 | H31 |
| 31 | H32 | H33 | H34 | H35 | H36 | H37 | H38 | H40 | H41 | H29 | H42 | H43 | H44 | H45 | H46 | H47 |
| 32 | H48 | H49 | H50 | H51 | H52 | H53 | H54 | H55 | H56 | H57 | H58 | H59 | H60 | H61 | H62 | H63 |
| 0 | First identifier I | I0 | I1 | I2 | I3 | I4 | I5 | I6 | I7 | I8 | I9 | I10 | I11 | I12 | I13 |
| 1 | I14 | I15 | I16 | I17 | I18 | I19 | I20 | I21 | I22 | I23 | I24 | I25 | I26 | I27 | I28 | I29 |
| 2 | I30 | I31 | I32 | I33 | I34 | I35 | I36 | I37 | I38 | I39 | I40 | I41 | I42 | I43 | I44 | I45 |

| | 0 | 1 | 2 | 3 | 4 | 5 | 6 | 7 | 8 | 9 | 10 | 11 |
|---|---|---|---|---|---|---|---|---|---|---|---|---|
| 0 | First identifier A | | A0 | A1 | A2 | A3 | A4 | A5 | A6 | A7 | A8 | A9 |
| 1 | A10 | A11 | A12 | A13 | A14 | A15 | A16 | A17 | A18 | A19 | A20 | A21 |
| 2 | A22 | A23 | A24 | A25 | A26 | A27 | A28 | A29 | A30 | A31 | A32 | A33 |
| 3 | A34 | A35 | A36 | A37 | A38 | A39 | A40 | A41 | A42 | A43 | A44 | A45 |
| 4 | A46 | A47 | A48 | A49 | A50 | A51 | A52 | A53 | A54 | A55 | A56 | A57 |
| 5 | A58 | A59 | A60 | A61 | A62 | A63 | A64 | A65 | A66 | A67 | A68 | A69 |
| 6 | A70 | A71 | A72 | A73 | A74 | A75 | A76 | A77 | A78 | A79 | First identifier B | |
| 7 | B0 | B1 | B2 | B3 | B4 | B5 | B6 | B7 | B8 | B9 | B10 | B11 |
| 8 | B12 | B13 | B14 | B15 | B16 | B17 | B18 | B19 | B20 | B21 | B22 | B23 |
| 9 | B24 | B25 | B26 | B27 | B28 | B29 | B30 | B31 | B32 | B33 | B34 | B35 |
| 10 | B36 | B37 | B38 | B39 | B40 | B41 | B42 | B43 | B44 | B45 | B46 | B47 |
| 11 | B48 | B49 | B50 | B51 | B52 | B53 | B54 | B55 | B56 | B57 | B58 | B59 |
| 12 | B60 | B61 | B62 | B63 | B64 | B65 | B66 | B67 | B68 | B69 | B70 | B71 |
| 13 | B72 | B73 | B74 | B75 | B76 | B77 | B78 | B79 | First identifier C | | C0 | C1 |
| 14 | C2 | C3 | C4 | C5 | C6 | C7 | C8 | C9 | C10 | C11 | C12 | C13 |
| 15 | C14 | C15 | C16 | C17 | C18 | C19 | C20 | C21 | C22 | C23 | C24 | C25 |
| 16 | C26 | C27 | C28 | C29 | C30 | C31 | C32 | C33 | C34 | C35 | C36 | C37 |
| 17 | C38 | C39 | C40 | C41 | C42 | C43 | C44 | C45 | C46 | C47 | C48 | C49 |
| 18 | C50 | C51 | C52 | C53 | C54 | C55 | C56 | C57 | C58 | C59 | C60 | C61 |
| 19 | C62 | C63 | C64 | C65 | C66 | C67 | C68 | C69 | C70 | C71 | C72 | C73 |
| 20 | C74 | C75 | C76 | C77 | C78 | C79 | First identifier D | | D0 | D1 | D2 | D3 |

| | | | | | | | | | | | |
|---|---|---|---|---|---|---|---|---|---|---|---|
| 21 | D4 | D5 | D6 | D7 | D8 | D9 | D10 | D11 | D12 | D13 | D14 | D15 |
| 22 | D16 | D17 | D18 | D19 | D20 | D21 | D22 | D23 | D24 | D25 | D26 | D27 |
| 23 | D28 | D29 | D30 | D31 | D32 | D33 | D34 | D35 | D36 | D37 | D38 | D39 |
| 24 | D40 | D41 | D42 | D43 | D44 | D45 | D46 | D47 | D48 | D49 | D50 | D51 |
| 25 | D52 | D53 | D54 | D55 | D56 | D57 | D58 | D59 | D60 | D61 | D62 | D63 |
| 26 | D64 | D65 | D66 | D67 | D68 | D69 | D70 | D71 | D72 | D73 | D74 | D75 |
| 27 | D76 | D77 | D78 | D79 | First identifier E | E0 | E1 | E2 | E3 | E4 | E5 |
| 28 | E6 | E7 | E8 | E9 | E10 | E11 | E12 | E13 | E14 | E15 | E16 | E17 |
| 29 | E18 | E19 | E20 | E21 | E22 | E23 | E24 | E25 | E26 | E27 | E28 | E29 |
| 30 | E30 | E31 | E32 | E33 | E34 | E35 | E36 | E37 | E38 | E39 | E40 | E41 |
| 31 | E42 | E43 | E44 | E45 | E46 | E47 | E48 | E49 | E50 | E51 | E52 | E53 |
| 32 | E54 | E55 | E56 | E57 | E58 | E59 | E60 | E61 | E62 | E63 | E64 | E65 |
| 33 | E66 | E67 | E68 | E69 | E70 | E71 | E72 | E73 | E74 | E75 | E76 | E77 |
| 34 | E78 | E79 | First identifier F | F0 | F1 | F2 | F3 | F4 | F5 | F6 | F7 |
| 35 | F8 | F9 | F10 | F11 | F12 | F13 | F14 | F15 | F16 | F17 | F18 | F19 |
| 36 | F20 | F21 | F22 | F23 | F24 | F25 | F26 | F27 | F28 | F29 | F30 | F31 |
| 37 | F32 | F33 | F34 | F35 | F36 | F37 | F38 | F39 | F40 | F41 | F42 | F43 |
| 38 | F44 | F45 | F46 | F47 | F48 | F49 | F50 | F51 | F52 | F53 | F54 | F55 |
| 39 | F56 | F57 | F58 | F59 | F60 | F61 | F62 | F63 | F64 | F65 | F66 | F67 |
| 40 | F68 | F69 | F70 | F71 | F72 | F73 | F74 | F75 | F76 | F77 | F78 | F79 |
| 0 | First identifier G | G0 | G1 | G2 | G3 | G4 | G5 | G6 | G7 | G8 | G9 |
| 1 | G10 | G11 | G12 | G13 | G14 | G15 | G16 | G17 | G18 | G19 | G20 | G21 |
| 2 | G22 | G23 | G24 | G25 | G26 | G27 | G28 | G29 | G30 | G31 | G32 | G33 |

FIG. 19 (cont'd)

DATA ENCODING METHOD, DATA DECODING METHOD, AND COMMUNICATION APPARATUS

CROSS-REFERENCE TO RELATED APPLICATIONS

This application is a continuation of International Application No. PCT/CN2021/118074, filed on Sep. 13, 2021, which claims priority to Chinese Patent Application No. 202011019513.9, filed on Sep. 24, 2020. The disclosures of the aforementioned applications are hereby incorporated by reference in their entireties.

TECHNICAL FIELD

This application relates to the field of data coding technologies, and in particular, to a data encoding method, a data decoding method, and a communication apparatus.

BACKGROUND

To ensure reliability and quality of data transmission, a transmit side usually encodes to-be-transmitted data, so that the transmitted data satisfies a feature of a transmission channel. Essentially, data encoding is a mapping rule, for example, m-bit information is mapped to n-bit information.

Common data encoding modes include 8b/10b encoding, 64b/66b encoding, 128b/130b encoding, 256b/257b transcoding, and the like. Overheads of 8b/10b encoding are high. Overheads of 64b/66b encoding are lower than those of 8b/10b encoding. However, "01" and "10" introduce large baseline drift. Therefore, 64b/66b encoding that uses PAM4 modulation cannot ensure good signal direct current balance. That is, 64b/66b encoding is not user-friendly to a PAM4 modulation scheme. Compared with 64b/66b encoding, 128b/130b encoding further reduces encoding overheads. However, similar to 64b/66b encoding, 128b/130b encoding that uses PAM4 modulation cannot ensure good signal direct current balance. To further reduce encoding overheads, a 256b/257b transcoding solution is introduced. The transcoding solution is obtained based on 64b/66b transcoding, and the transcoding solution inherits disadvantages of 64b/66b encoding. In addition, there is 257, that is, a large prime number, in the 256b/257b transcoding solution. This limits design flexibility of reed-solomon encoding (reed-solomon forward error, RS-FEC), and has a long delay.

That is, existing 8b/10b encoding, 64b/66b encoding, 128b/130b encoding, and 256b/257b transcoding cannot satisfy requirements of encoding overheads, a delay, and signal direct current balance.

SUMMARY

This application provides a data encoding method, a data decoding method, and a communication apparatus, to ensure direct current balance in four-level pulse amplitude modulation (4 Pulse Amplitude Modulation, PAM4) modulation, and reduce a data transmission delay.

According to a first aspect, an embodiment of this application provides a data encoding method. The method may be performed by a first communication apparatus. The first communication apparatus may be a communication device or a communication apparatus that can support the communication device in implementing a function required in the method, for example, a chip system. The following uses an example in which the communication device is a transmit end for description. The transmit end may be an ethernet interface apparatus or a transmit end, or may be an apparatus having an internet technology (internet technology, IT) interface, or may be an ethernet interface or an IT interface. The method includes:

generating M encoding units and distributing the M encoding units to N transmission channels. The M encoding units are obtained by encoding L frames. The M encoding units include at least one first-type unit. The first-type unit includes a first identifier. The first identifier indicates a start location that is in the first-type unit and that is of a frame header of a first frame in the L frames. M is an integer greater than or equal to 1, L is an integer greater than or equal to 1, and N is an integer greater than or equal to 1.

In this embodiment of this application, after the L frames are encoded, data is divided into the M encoding units, and the first identifier indicates a start location of a frame header included in each encoding unit. In this way, a receive end can delimit each frame. In addition, the first identifier may control a quantity of consecutive "0"s and consecutive "1"s in the entire data stream, so that a clock recovery circuit at the receive end works normally, and clock drift is avoided. In addition, the first identifier itself can satisfy signal direct current balance. Even if a valid payload in an encoding unit is scrambled, signal direct current balance can still be satisfied for the entire encoding unit, to ensure signal direct current balance in a PAM4 modulation scheme and an NRZ modulation scheme.

In a possible implementation, the first-type unit includes a first field, a second field, and a third field. The first field is used for carrying the first identifier. The second field is used for carrying a part or all of data in one or more of the L frames. The third field is used for carrying check information for checking the first-type unit.

This solution provides a structure of the first-type unit, to be specific, including a first field used for carrying a first identifier, a second field used for carrying data, and a third field used for carrying check information for checking the first-type unit. A length of each field may be specified in advance, so that the receive end can decode the first-type unit.

In a possible implementation, the first-type unit includes a first field and a second field. The first field is used for carrying the first identifier. The second field is used for carrying a part or all of data in one or more of the L frames.

This solution provides a structure of the first-type unit, to be specific, including a first field used for carrying a first identifier and a second field used for carrying data. In this structure, the first-type unit does not separately check the data in the unit. Therefore, reliability of a payload carried by the first-type unit is ensured by a check bit carried in an upper-layer frame. This solution can further compress overheads of the encoding unit and improve carrying efficiency of the encoding unit.

In a possible implementation, the M encoding units further include at least one second-type unit. The second-type unit includes a second field. Data carried in a first unit belongs to a frame corresponding to a first identifier in a second unit. The first unit is one of the at least one second-type unit. The second unit is one of the at least one first-type unit. The second unit is a first-type unit preceding the first unit.

In this solution, the first field used for carrying the first identifier may be used for carrying data, to improve carrying efficiency of the encoding unit. For the receive end, the receive end may determine that a valid payload carried by a second-type unit belongs to a frame corresponding to a first identifier in a first-type unit preceding the second-type unit; or the receive end may determine that valid payloads carried by a plurality of consecutive second-type units belong to a frame corresponding to a first identifier in a first-type unit preceding the plurality of consecutive second-type units.

In a possible implementation, the second field includes K subfields. The K subfields each occupy a same quantity of bits, or at least two of the K subfields occupy different quantities of bits.

In this solution, valid payloads of the L frames are carried in the K subfields, and valid payloads of different frames may be carried in different subfields of a same encoding unit. In this solution, lengths of the K subfields are not limited, and lengths of the K subfields each may be the same or different, to improve flexibility of carrying the payload.

In a possible implementation, the start location of the frame header of the first frame is a start location of a first subfield in the K subfields. This solution specifies the start location of the frame header of the first frame, and the receive end may clearly know the start location of the frame header from a received encoding unit, to delimit each frame.

In a possible implementation, the first identifier includes X bits, and the X bits satisfy direct current balance in a four-level pulse amplitude modulation PAM4 modulation scheme.

In a possible implementation, the X bits further satisfy direct current balance in a non-return-to-zero NRZ modulation scheme.

In this solution, the first identifier itself may satisfy signal direct current balance. In this way, even if a valid payload in an encoding unit is scrambled, signal direct current balance can still be satisfied for the entire encoding unit, to ensure signal direct current balance in a PAM4 modulation scheme and an NRZ modulation scheme.

In a possible implementation, X is equal to 16, and the first identifier includes 1110010011100100, 0010011111011000, 0110001110000111, 1000011101100011, 0111100010011100, 1001110001111000, 1101100000100111, or 0001101100011011. This solution provides a specific implementation of the first identifier. For example, the X bits are obtained by adjusting a bit sequence of an eBCH code word according to a preset rule. Because the first identifier may be generated by using an eBCH code word, that is, an error correction and detection code word, the first identifier is protected, and there is no need to additionally set check information for protecting the first identifier, to reduce encoding overheads.

In a possible implementation, the at least one first-type unit is distributed in polling mode to the N transmission channels at a fixed length.

For example, a distribution sequence of a first identifier of a third unit in the at least one first-type unit is before a distribution sequence of a valid payload. To be specific, the at least one first-type unit is distributed, based on a distribution sequence of the first identifier before a distribution sequence of the valid payload, to the N transmission channels at a fixed length. This is simple.

Further, a distribution sequence of a first identifier of a fourth unit in the at least one first-type unit is after distribution sequences of a part of valid payloads. To be specific, distribution sequences of first identifiers of a part of units in the at least one first-type unit is before a distribution sequence of a valid payload, and distribution sequences of first identifiers of a part of units in the at least one first-type unit is after distribution sequences of a part of valid payloads. That is, in a same round or different rounds, distribution sequences of the first identifiers of the first-type units may be different. For example, after the first-type units are distributed in polling mode in a previous round based on a distribution sequence of the first identifier before a distribution sequence of the valid payload, occurrence probabilities of first identifiers on all transmission channels are different. In this case, during next polling, the distribution sequence of the transmission channels may be adjusted. In this way, the occurrence probabilities of the first identifiers on all the transmission channels are the same. Therefore, signal direct current balance on all the transmission channels is ensured.

For another example, the N transmission channels include P transmission channel groups. In a first round, a polling sequence of a first transmission channel group in the P transmission channel groups is before a polling sequence of a second transmission channel group in the P transmission channel groups. In another round, a polling sequence of the first transmission channel group is after a polling sequence of the second transmission channel group. That is, the N transmission channels may be grouped and bound. For example, two adjacent transmission channels are bound into one group, and the M encoding units are distributed to the P transmission channel groups in a unit of a transmission channel group. In different rounds, polling sequences of a same transmission channel group may be different. For example, after a polling, if occurrence probabilities of first identifiers on all transmission channels are different, the distribution sequence of the transmission channels may be adjusted during next polling. In this way, the occurrence probabilities of the first identifiers on all the transmission channels are the same. Therefore, signal direct current balance on all the transmission channels is ensured. Because a transmission channel group is a unit, adjusting a polling sequence of a transmission channel group is adjusting a polling sequence of a payload carried in the transmission channel group. This facilitates decoding at the receive end and can reduce implementation complexity at the receive end.

In a possible implementation, before the sending the M encoding units, the method further includes:

for any one of the N transmission channels, adjusting a part of bits of one or more first identifiers of the transmission channel based on a direct current balance status of the transmission channel. In this solution, it may be considered that the first identifier is generated by using an error correction and detection code word. In this case, the first identifier itself has an error correction capability. Even if a part of bits of the first identifier are adjusted, the receive end may perform error correction on the first identifier, and identification of the first identifier is not affected. Therefore, signal direct current balance of any data stream within a specific length range may be ensured by adjusting a part of bits of the first identifier.

According to a second aspect, an embodiment of this application provides a data decoding method. The method may be performed by a second communication apparatus. The second communication apparatus may be a communication device or a communication apparatus that can support a communication device in implementing a function required in the method, for example, a chip system. The following uses an example in which the communication device is a receive end for description. The receive end may be an ethernet interface apparatus or a transmit end, or may be an apparatus having an IT interface, or the receive end may be an ethernet interface or an IT interface. The method includes:

receiving M encoding units from N transmission channels, where the M encoding units are obtained by encoding L frames, the M encoding units include at least one first-type unit, the first-type unit includes a first identifier, the first identifier indicates a location that is in the first-type unit and that is of a frame header of a first frame in the L frames, M is an integer greater than or equal to 1, L is an integer greater than or equal to 1, and N is an integer greater than or equal to 1.

decoding the M encoding units based on at least one first identifier, to obtain the L frames.

In a possible implementation, the first-type unit includes a first field and a second field. The first field is used for carrying the first identifier. The second field is used for carrying a part or all of data in one or more of the L frames.

In a possible implementation, the first-type unit further includes a third field. The third field is used for carrying check information for checking the first-type unit.

In a possible implementation, the M encoding units further include at least one second-type unit. The second-type unit includes a second field. Data carried in a first unit belongs to a frame corresponding to a first identifier in a second unit. The first unit is one of the at least one second-type unit. The second unit is one of the at least one first-type unit. The second unit is a first-type unit preceding the first unit.

In a possible implementation, the second field includes K subfields. The K subfields each occupy a same quantity of bits, or at least two of the K subfields occupy different quantities of bits.

In a possible implementation, a start location of the frame header of the first frame is a start location of a first subfield in the K fields.

In a possible implementation, the first identifier includes X bits, and the X bits satisfy direct current balance in a four-level pulse amplitude modulation PAM4 modulation scheme.

In a possible implementation, the X bits further satisfy direct current balance in a non-return-to-zero NRZ modulation scheme.

In a possible implementation, X is equal to 16, and the first identifier includes 1110010011100100, 0010011111011000, 0110001110000111, 1000011101100011, 0111100010011100, 1001110001111000, 1101100000100111, or 0001101100011011.

In a possible implementation, the M encoding units are received in polling mode from the N transmission channels at a fixed length.

For example, a distribution sequence of a first identifier of a third unit in the at least one first-type unit is before a distribution sequence of a valid payload.

Further, a distribution sequence of a first identifier of a fourth unit in the at least one first-type unit is after distribution sequences of a part of valid payloads.

For another example, the N transmission channels include P transmission channel groups, and in a first round, a polling sequence of a first transmission channel group in the P transmission channel groups is before a polling sequence of a second transmission channel group in the P transmission channel groups.

Further, in a second round, a polling sequence of the first transmission channel group in the P transmission channel groups is after a polling sequence of the second transmission channel group.

For technical effects brought by the second aspect or the possible implementations of the second aspect, refer to the descriptions of the technical effects of the first aspect or the possible implementations of the first aspect.

According to a third aspect, a communication apparatus is provided. The communication apparatus has a function of implementing behavior in the method embodiment of the first aspect. The function may be implemented by hardware, or may be implemented by hardware executing corresponding software. The hardware or the software includes one or more modules corresponding to the foregoing function. In a possible implementation, a processor and a transceiver are included.

The processor is configured to generate M encoding units. The M encoding units are obtained by encoding L frames. The M encoding units include at least one first-type unit. The first-type unit includes a first identifier. The first identifier indicates a start location that is in the first-type unit and that is of a frame header of a first frame in the L frames. M is an integer greater than or equal to 1, and L is an integer greater than or equal to 1. The transceiver is configured to distribute the M encoding units to N transmission channels. N is an integer greater than or equal to 1.

In a possible implementation, the first-type unit includes a first field, a second field, and a third field. The first field is used for carrying the first identifier. The second field is used for carrying a part or all of data in one or more of the L frames. The third field is used for carrying check information for checking the first-type unit.

In a possible implementation, the first-type unit includes a first field and a second field. The first field is used for carrying the first identifier. The second field is used for carrying a part or all of data in one or more of the L frames.

In a possible implementation, the M encoding units further include at least one second-type unit. The second-type unit includes a second field. Data carried in a first unit belongs to a frame corresponding to a first identifier in a second unit. The first unit is one of the at least one second-type unit. The second unit is one of the at least one first-type unit. The second unit is a first-type unit preceding the first unit.

In a possible implementation, the second field includes K subfields. The K subfields each occupy a same quantity of bits, or at least two of the K subfields occupy different quantities of bits.

In a possible implementation, the start location of the frame header of the first frame is a start location of a first subfield in the K subfields.

In a possible implementation, the first identifier includes X bits, and the X bits satisfy direct current balance in a four-level pulse amplitude modulation PAM4 modulation scheme.

In a possible implementation, the X bits further satisfy direct current balance in a non-return-to-zero NRZ modulation scheme.

In a possible implementation, X is equal to 16, and the first identifier includes 1110010011100100, 0010011111011000, 0110001110000111, 1000011101100011, 0111100010011100, 1001110001111000, 1101100000100111, or 0001101100011011.

In a possible implementation, the transceiver is specifically configured to distribute the at least one first-type unit in polling mode to the N transmission channels at a fixed length.

For example, a distribution sequence of a first identifier of a third unit in the at least one first-type unit is before a distribution sequence of a valid payload.

Further, a distribution sequence of a first identifier of a fourth unit in the at least one first-type unit is after distribution sequences of a part of valid payloads.

For another example, the N transmission channels include P transmission channel groups, and in a first round, a polling sequence of a first transmission channel group in the P transmission channel groups is before a polling sequence of a second transmission channel group in the P transmission channel groups.

Further, in a second round, a polling sequence of the first transmission channel group in the P transmission channel groups is after a polling sequence of the second transmission channel group.

In a possible implementation, before sending the M encoding units, the transceiver is further configured to:

for any one of the N transmission channels, adjust a part of bits of one or more first identifiers of the transmission channel based on a direct current balance status of the transmission channel.

For technical effects brought by the third aspect or the possible implementations of the third aspect, refer to the descriptions of the technical effects of the first aspect or the possible implementations of the first aspect.

According to a fourth aspect, a communication apparatus is provided. The communication apparatus has a function of implementing behavior in the method embodiment of the second aspect. The function may be implemented by hardware, or may be implemented by hardware executing corresponding software. The hardware or the software includes one or more modules corresponding to the foregoing function. In a possible implementation, a processor and a transceiver are included.

The transceiver is configured to receive M encoding units from N transmission channels. The M encoding units are obtained by encoding L frames. The M encoding units include at least one first-type unit. The first-type unit includes a first identifier. The first identifier indicates a location that is in the first-type unit and that is of a frame header of a first frame in the L frames. M is an integer greater than or equal to 1, L is an integer greater than or equal to 1, and N is an integer greater than or equal to 1. The processor is configured to decode the M encoding units based on at least one first identifier, to obtain the L frames.

In a possible implementation, the first-type unit includes a first field and a second field. The first field is used for carrying the first identifier. The second field is used for carrying a part or all of data in one or more of the L frames.

In a possible implementation, the first-type unit further includes a third field. The third field is used for carrying check information for checking the first-type unit.

In a possible implementation, the M encoding units further include at least one second-type unit. The second-type unit includes a second field. Data carried in a first unit belongs to a frame corresponding to a first identifier in a second unit. The first unit is one of the at least one second-type unit. The second unit is one of the at least one first-type unit. The second unit is a first-type unit preceding the first unit.

In a possible implementation, the second field includes K subfields. The K subfields each occupy a same quantity of bits, or at least two of the K subfields occupy different quantities of bits.

In a possible implementation, a start location of the frame header of the first frame is a start location of a first subfield in the K fields.

In a possible implementation, the first identifier includes X bits, and the X bits satisfy direct current balance in a four-level pulse amplitude modulation PAM4 modulation scheme.

In a possible implementation, the X bits further satisfy direct current balance in a non-return-to-zero NRZ modulation scheme.

In a possible implementation, X is equal to 16, and the first identifier includes 1110010011100100, 0010011111011000, 0110001110000111, 1000011101100011, 0111100010011100, 1001110001111000, 1101100000100111, or 0001101100011011.

In a possible implementation, the transceiver is specifically configured to receive the M encoding units in polling mode from the N transmission channels at a fixed length.

For example, a distribution sequence of a first identifier of a third unit in the at least one first-type unit is before a distribution sequence of a valid payload.

Further, a distribution sequence of a first identifier of a fourth unit in the at least one first-type unit is after distribution sequences of a part of valid payloads.

For another example, the N transmission channels include P transmission channel groups, and in a first round, a polling sequence of a first transmission channel group in the P transmission channel groups is before a polling sequence of a second transmission channel group in the P transmission channel groups.

Further, in a second round, a polling sequence of the first transmission channel group in the P transmission channel groups is after a polling sequence of the second transmission channel group.

For technical effects brought by the fourth aspect or the possible implementations of the fourth aspect, refer to the descriptions of the technical effects of the second aspect or the possible implementations of the second aspect.

According to a fifth aspect, an embodiment of this application provides a communication apparatus. The communication apparatus may be the communication apparatus in the third aspect or the fourth aspect in embodiments, or a chip disposed in the communication apparatus in the third aspect or the fourth aspect. The communication apparatus includes a communication interface and a processor, and optionally, further includes a memory. The memory is configured to store a computer program, instructions, or data. The processor is coupled to the memory and the communication interface. When the processor reads the computer program, the instructions, or the data, the communication apparatus is enabled to perform the method performed by the transmit end or the receive end in the method embodiment in the first aspect or the second aspect.

It should be understood that the communication interface may be implemented through an IT interface, an ethernet interface, a codec, or the like in the communication apparatus. Alternatively, if the communication apparatus is a chip disposed at a transmit end or a receive end, the communication interface may be an input/output interface of the chip, for example, an input/output pin.

According to a sixth aspect, an embodiment of this application provides a chip system. The chip system includes a processor, may further include a memory, and is configured to implement the method performed by the communication apparatus in the third aspect or the fourth aspect. In a possible implementation, the chip system further includes the memory, configured to store program instructions and/or data. The chip system may include a chip, or may include a chip and another discrete component.

According to a seventh aspect, an embodiment of this application provides a communication system. The communication system includes the communication apparatus in the third aspect and the communication apparatus in the fourth aspect.

According to an eighth aspect, this application provides a computer-readable storage medium. The computer-readable storage medium stores a computer program. When the computer program is run, the method performed by the transmit end in the foregoing aspects is implemented, or the method performed by the receive end in the foregoing aspects is implemented.

According to a ninth aspect, a computer program product is provided. The computer program product includes computer program code. When the computer program code is run, the method performed by the transmit end in the foregoing aspects is performed, or the method performed by the receive end in the foregoing aspects is performed.

For beneficial effects of the fifth aspect to the ninth aspect and the implementations of the fifth aspect to the ninth aspect, refer to the descriptions of beneficial effects of the method in the first aspect or the second aspect and the implementations of the first aspect or the second aspect.

BRIEF DESCRIPTION OF DRAWINGS

FIG. 3A and FIG. 3B are a 128b/130b encoding format on four transmission links;

FIG. 6A and FIG. 6B are a schematic diagram of a mapping mode of mapping a first frame to a first-type unit according to an embodiment of this application;

FIG. 7A and FIG. 7B are a schematic diagram of a mapping mode of mapping L frames to M encoding units according to an embodiment of this application;

FIG. 9A and FIG. 9B are a schematic diagram of a mapping mode of mapping a first frame to a first-type unit according to an embodiment of this application;

FIG. 10A and FIG. 10B are a schematic diagram of another mapping mode of mapping L frames to M encoding units according to an embodiment of this application;

FIG. 14A and FIG. 14B are a schematic diagram of a mapping mode of mapping a frame to a plurality of first-type units and second-type units according to an embodiment of this application;

FIG. 15 is a schematic diagram of a distribution rule of polling M encoding units to 16 transmission channels based on 68 bytes according to an embodiment of this application;

FIG. 16 is a schematic diagram of a distribution rule of polling M encoding units to 12 transmission channels based on 68 bytes according to an embodiment of this application;

FIG. 17 is a schematic diagram of a distribution rule of polling M encoding units to eight transmission channels based on 68 bytes according to an embodiment of this application;

FIG. 18 is a schematic diagram of a distribution rule of polling M encoding units to 16 transmission channels based on 66 bytes according to an embodiment of this application;

FIG. 19 is a schematic diagram of a distribution rule of polling M encoding units to 16 transmission channels based on 82 bytes according to an embodiment of this application;

DESCRIPTION OF EMBODIMENTS

To make objectives, technical solution, and advantages of embodiments of this application clearer, the following further describes embodiments of this application in detail with reference to the accompanying drawings.

Figure 1:
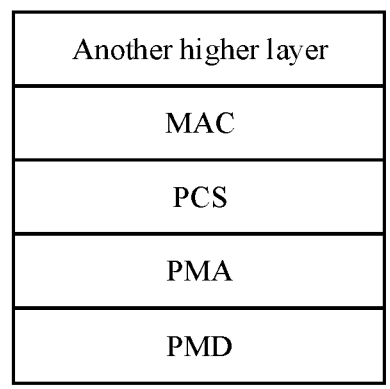
FIG. 1 is a schematic diagram of a structure of a communication interface.

FIG. 1 shows a structure of a communication interface. The communication interface may be an ethernet interface, an IT interface, or another communication interface that may transmit information. For example, the communication interface is an ethernet interface. As shown in FIG. 1, the communication interface may include another higher layer (higher layer), a medium access control (media access control, MAC) layer, a physical encoding sublayer (physical coding sublayer, PCS), a physical medium attachment (physical medium attachment, PMA) layer, and a physical medium dependent (physical medium dependent, PMD) layer. It should be noted that FIG. 1 shows only a part of layers. The communication interface may further include another possible layer, for example, a logical link control (logic link control, LLC) layer located between another higher layer and a MAC layer, a reconciliation sublayer (reconciliation sublayer, RS) located between the MAC layer and the PCS layer, or a reed-solomon encoding (reed-solomon forward error, RS-FEC) sublayer located between the PCS layer and the PMA layer. It should be understood that, for different interface standard protocols, names of layers are different. Names of layers involved in various interface standard protocols are not limited in this embodiment of this application. For example, in some interface standard protocols, there may be no MAC layer. In this case, the MAC layer transmitting data to the PCS layer may be considered as that an upper layer transmits data to the PCS layer. In the following descriptions, an example in which embodiments of this application are applied to an ethernet interface is used.

When a transmit end sends a data stream, the data stream is transmitted through a communication interface, and is sequentially processed at a MAC layer, an RS layer, a PCS layer, an RS-FEC sublayer, a PMA layer, and a PMD layer from top to bottom. A processed data stream is represented as a signal sent to a link medium. A receive end receives a signal from the link medium, and sequentially processes the signal at the PMD layer, the PMA layer, the RS-FEC sublayer, and the PCS layer, to recover a data stream at the MAC layer. That is, the receive end is a reverse process of the transmit end.

To ensure reliability and quality of data transmission, data encoding is involved from the PCS layer to the PMA layer, so that transmitted data satisfies a feature of a transmission channel. Essentially, data encoding is a mapping rule, for example, m-bit (bit) information is mapped to n-bit information. To help a person skilled in the art understand the technical solutions provided in embodiments of this application, several common data encoding formats are first described.

(1) 8b/10b encoding, that is, m=8 and n=10. The 8b/10b encoding is to decompose a group of continuous 8-bit data into a group of data including 3-bit data and a group of data including 5-bit data, that is, two groups of data. Special characters are separately added to the two groups of data, and the two groups of data are encoded into a group of 4-bit data and a group of 6-bit data, that is, 10-bit data respectively. On the contrary, decoding is to decode one group of input 10-bit data to obtain 8-bit data. The 8b/10b encoding is to encode 8-bit data and some special characters into 10-bit data based on a specific rule. Therefore, one or more bit errors generated during transmission can be detected, and when a transmission error of a data bit is detected, the error can be corrected, to ensure correct transmission of data.

The 8b/10b encoding uses non-return-to-zero (not return to zero) (non-return to zero, NRZ) modulation. Encoding of a next character is determined by detecting imbalance of a previous character. That is, if the previous character is a positive unbalanced character, the next character should be negative unbalanced. In this way, a "0" needs to be inserted after every five consecutive "1"s, or a "1" needs to be inserted after every five consecutive "0"s. That is, a maximum of five consecutive "1"s or "0"s can be inserted. This continuous imbalance mechanism ensures that a quantity of "0"s and "1"s in the entire bit stream is basically the same, to ensure signal direct current (direct current, DC) balance. In addition, because the consecutive "1"s or "0"s do not exceed five bits, a receive end may consider that a level jump occurs after every five consecutive bits. In this way, a clock recovery circuit can work normally, to avoid data loss caused by clock drift or synchronization loss at the receive end, that is, data transmitted by a transmit end can be correctly recovered at the receive end.

However, the 8b/10b encoding is essentially inserting 2-bit redundancy into an 8-bit valid payload. Therefore, an overhead of the 8b/10b encoding is up to 25%, and encoding efficiency is low. Therefore, an encoding mode with a low overhead is proposed, for example, 64b/66b encoding with an encoding overhead of 3.125%.

(2) 64b/66b encoding, that is, m=64, and n=66. The 64b/66b encoding is an encoding mode that converts a 64-bit valid payload into a 66-bit code block, and is defined by the IEEE 802.3 working group. A 66-bit code block includes a 2-bit synchronization header and a 64-bit valid payload. The 2-bit synchronization header includes a zero$^{th}$ bit and a first bit of the code block, and the 2-bit synchronization header includes two cases, that is, the 2-bit synchronization header may be "01" or "10". If the synchronization header is "01", the 64-bit valid payload is a data code block. If the synchronization header is "10", the 64-bit valid payload includes an 8-bit control code block and 56-bit control information and/or data. A field of the control code block may be referred to as a type field (which may be referred to as a type field) of the control code block. It should be understood that "00" and "11" are not used. If there are "00" and "11" in the 66-bit code block, it may be considered that a bit error occurs on a link.

Because a 2-bit synchronization header is inserted into every 64-bit valid payload, it can be ensured that a bit jump occurs after every 66 bits. In this way, a clock recovery circuit can work more easily, to avoid data loss caused by clock drift or synchronization loss at a receive end, that is, a transmitted data string can be correctly recovered at the receive end.

If "0" and "1" in a code block stream received by the receive end are not evenly distributed, the receive end may not be able to accurately determine the synchronization header. Therefore, the 64b/66b encoding usually uses an NRZ modulation format, and a 64-bit valid payload is scrambled based on a self-synchronizing scrambling manner of $X^{58}+X^{39}+1$. In this way, "0" and "1" in a transmitted 66-bit code block are evenly distributed, and DC balance can be ensured.

It should be understood that a physical interface using 64b/66b encoding distributes to-be-transmitted data to a plurality of transmission channels at a granularity of a 66-bit code block, and then aggregates data of the plurality of transmission channels and transmits the data on the plurality of transmission channels. However, for each transmission channel, data is sent after a 64-bit valid payload is obtained, a type is determined, a synchronization header is added, and a 66-bit code block is obtained. To be specific, before sending a code block, each transmission channel needs to wait until a 64-bit valid payload is obtained, that is, a waiting time causes a data transmission delay.

(3) 128b/130b encoding, that is, m=128, n=130. Compared with 8b/10b encoding, the 128b/130b encoding can improve bandwidth utilization. For example, the bandwidth utilization can be improved from 80% to 98.46%. Similar to 64b/66b encoding, 128b/130b encoding adds a 2-bit synchronization header before a 128-bit payload. When the synchronization header is "01", it indicates that control data (Ordered Set) is followed; when the synchronization header is "10", it indicates that payload data (non-Order Set) is followed. Different from 64b/66b encoding, a physical interface using 128b/130b encoding, for example, a peripheral component interconnect standard (peripheral component interconnect express, PCIE) interface, first distributes data to a plurality of transmission links in a unit of byte, and then adds a synchronization header to each transmission link one by one. If 128-bit data is pure data, a "01" synchronization header is added. If 128-bit data is not pure data, a "10" synchronization header is added. A 2-bit synchronization header and a 128-bit payload together are referred to as a data block (data block).

Figure 2:
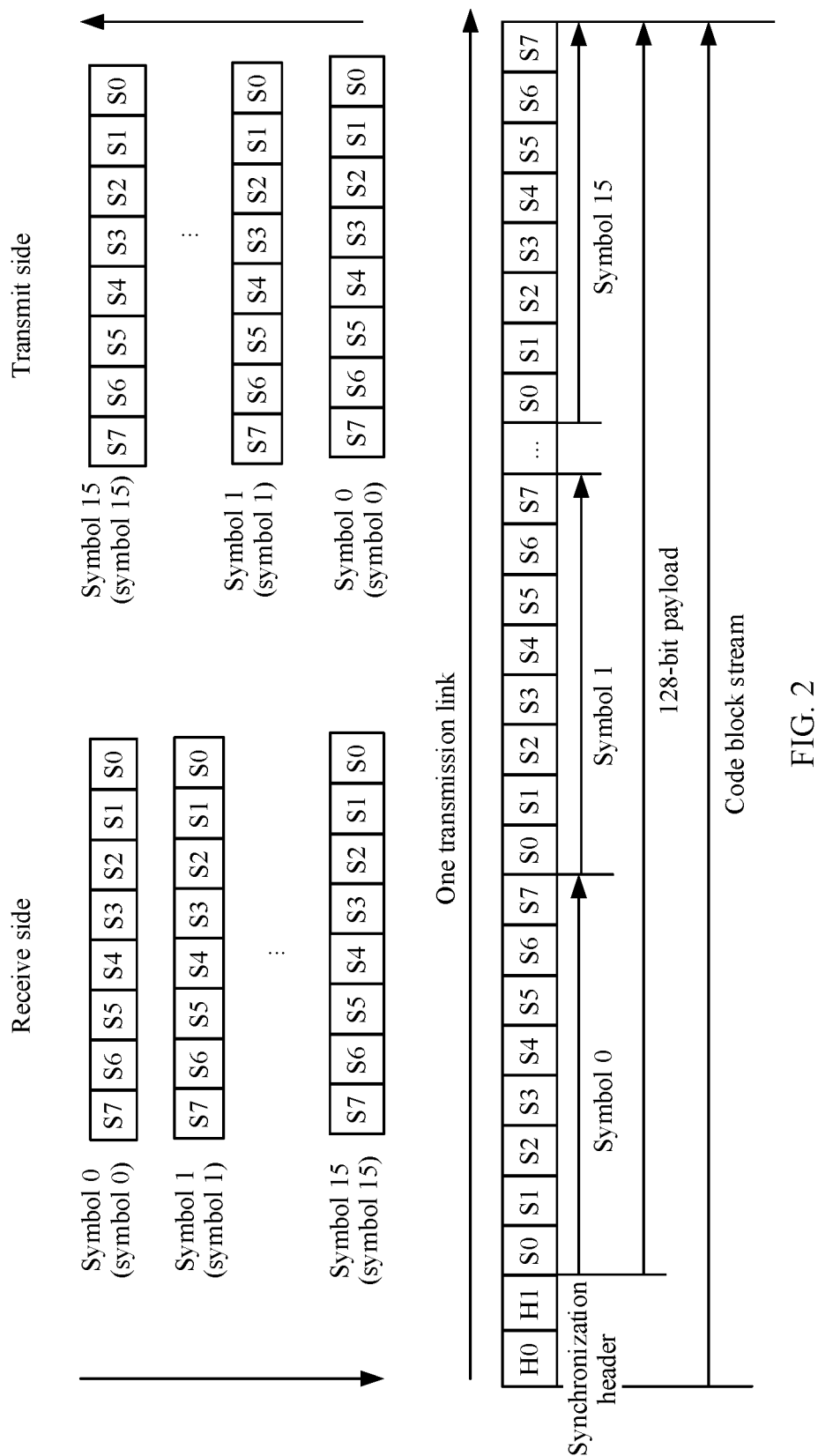
FIG. 2 is a 128b/130b encoding format on a transmission link.

For example, FIG. 2 and FIG. 3A and FIG. 3B respectively show a 128b/130b encoding format on one transmission link and a 128b/130b encoding format on four transmission links. A symbol (symbol) in FIG. 2 and FIG. 3A and FIG. 3B may carry an 8-bit code block (S0 to S7). S0 is a least significant bit, and S7 is a most significant bit. As shown in FIG. 2, a transmit side adds a 2-bit synchronization header (H0 and H1) on a transmission link, and a 128-bit payload is behind a synchronization block. A code block stream on the entire transmission link includes a 2-bit synchronization header and a 128-bit payload. As shown in FIG. 3A and FIG. 3B, a transmit side encodes to-be-sent data blocks and distributes the to-be-sent data blocks to four transmission links. During the distribution, the transmit side adds a synchronization header on each transmission link in sequence, and distributes the data to each transmission link in a unit of byte.

It should be understood that a maximum quantity of consecutive "0"s and consecutive "1"s on a link is 128. If "0"s and "1"s in a code block stream received by a receive end are not evenly distributed, there is obvious baseline drift in a system. This affects SerDes performance on a receive side. A maximum quantity of consecutive "0"s and "1"s on a link is 128. Therefore, the 128b/130b encoding cannot satisfy good DC balance. Similar to the 64b/66b encoding, the 128b/130b encoding satisfies DC balance by introducing scrambling codes into data of the 128b/130b encoding.

(4) 256b/257b transcoding refers to mapping from four 66b code blocks to one 257b code block. This can further reduce encoding overheads.

The 256b/257b transcoding is obtained based on 64b/66b transcoding, and the transcoding solution inherits disadvantages of 64b/66b encoding. In addition, there is 257, that is, a large prime number, in the 256b/257b transcoding solution. This limits design flexibility of reed-solomon encoding (reed-solomon forward error, RS-FEC), and has a long delay.

The foregoing 8b/10b, 64b/66b, 128b/130b, 256b/257b transcoding is not applicable to a PAM4 modulation scheme. This is because "01" and "10" are respectively mapped to a "−1" level and a "+1" level in gray encoding and PAM4 modulation. However, on a link, a probability of occurrence of a synchronization header "01" is usually far higher than a probability of occurrence of a synchronization header "10". Therefore, if PAM4 modulation is used for 8b/10b, 64b/66b, and 128b/130b, there is a high probability that a "−1" level occurs within a period of time. In this case, direct current baseline drift is introduced, it cannot be ensured that a clock data recovery circuit (clock data recovery, CDR) at a receive end works normally, and data loss or introducing of a bit error occurs. That is, it cannot be ensured that data transmitted by a transmit end can be correctly recovered at the receive end.

In view of this, embodiments of this application provide a data encoding solution that can be applied to NRZ modulation and PAM4 modulation, to reduce an encoding delay as much as possible, simplify a Gearbox design, and ensure DC balance.

The solutions provided in embodiments of this application may be applied to a scenario in which encoding format conversion is required. For example, the scenario relates to technical fields such as an ethernet interface, an IT interface, a PCI interface, a PCIe interface, and a memory interface. An example in which embodiments of this application are applied to an ethernet interface is used below.

According to the solution provided in embodiments of this application, a to-be-sent data stream may be encoded, and the improved solution may be implemented in a sending module. According to the solution provided in embodiments of this application, the received data stream may be further decoded, and the improved solution may be implemented in a receiving module. To be specific, the improved solution in embodiments of this application relates to a sending module and a receiving module. The sending module and the receiving module may be located on one node, or the sending module and the receiving module are located on different nodes. The following describes technical solutions provided in embodiments of this application by using an example in which the sending module is located at the transmit end and the receiving module is located at the receive end.

Figure 4:
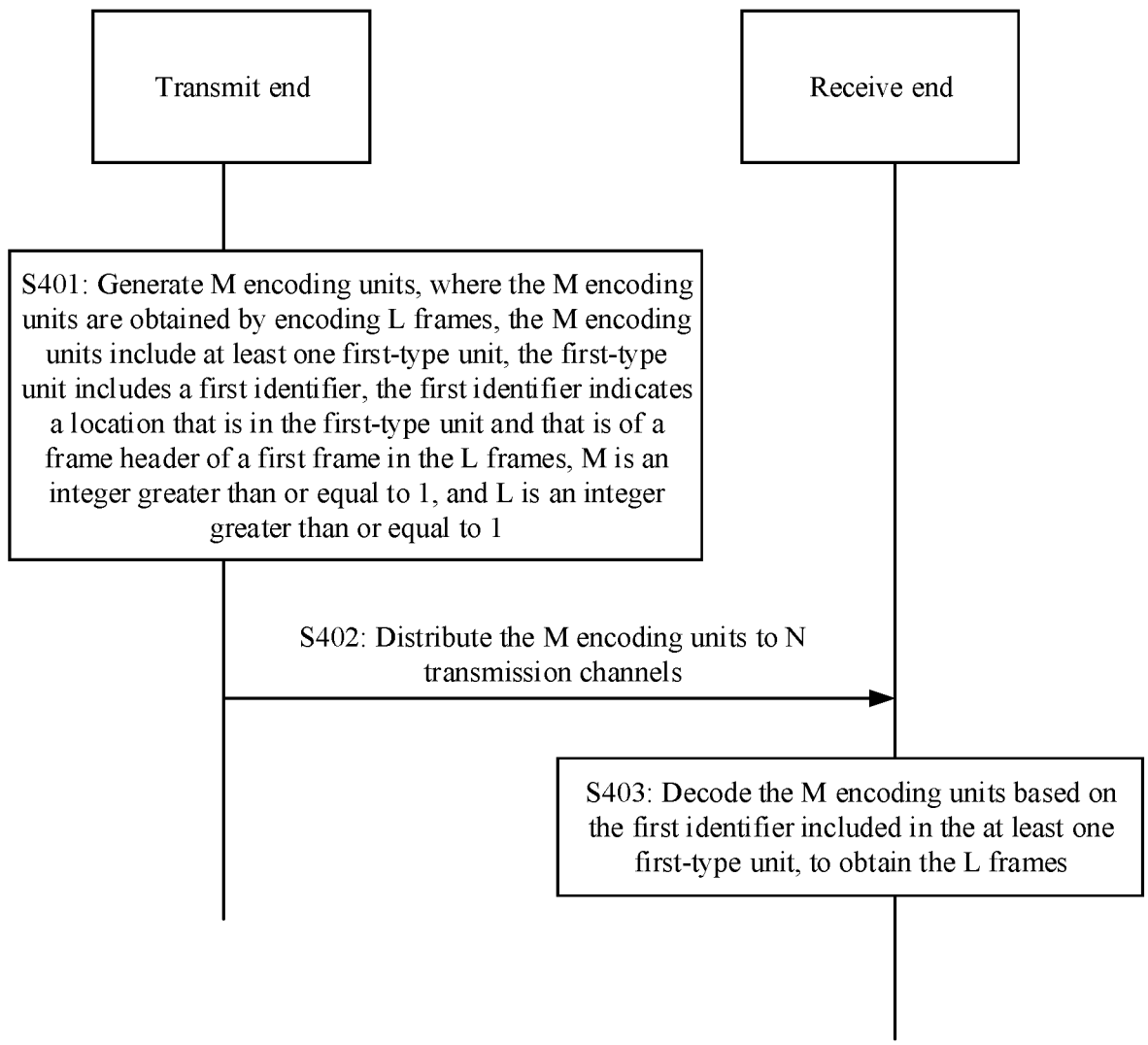
FIG. 4 is a schematic flowchart of a data encoding method according to an embodiment of this application.

FIG. 4 is a schematic flowchart of a data encoding method according to an embodiment of this application. In embodiments of this application, data encoding is encoding at a PCS layer. An upper layer transmits data to the PCS layer, and the PCS layer receives L frames from the upper layer, and encodes the L frames to generate a plurality of encoding units. In embodiments of this application, encoding is encoding at the PCS layer. Therefore, the encoding unit may also be referred to as a physical encoding unit (physical coding unit), and may be referred to as a phit for short. That is, in the following, the phit represents an encoding unit. The frame refers to a data unit (MAC frame) that complies with IEEE 802.3 frame requirements. If the data encoding is applied to another protocol standard interface, the frame may alternatively be a data unit that complies with another protocol standard, for example, a data link packet (data link layer package, DLLP). Specifically, a procedure of the data encoding method provided in this embodiment of this application is described as follows.

S401: A transmit end generates M encoding units, where the M encoding units are obtained by encoding L frames, the M encoding units include at least one first-type unit, the first-type unit includes a first identifier, the first identifier indicates a location that is in the first-type unit and that is of a frame header of a first frame in the L frames, M is an integer greater than or equal to 1, and L is an integer greater than or equal to 1.

Embodiments of this application are intended to provide an encoding scheme applicable to PAM4 modulation, and ensure signal direct current balance. In this embodiment of this application, the PCS layer may encode one or more received frames, to generate a plurality of encoding units. The PCS layer encodes the frame, that is, maps the frame to the encoding unit. It should be understood that the encoding unit should include original information of the frame and additional information, so that a receive end can correctly decode the M encoding units to obtain the original information of the frame. It should be understood that if lengths of the plurality of encoding units are different, encoding is complex. Therefore, in this embodiment of this application, a length of each encoding unit may be fixed, to reduce encoding complexity. For example, a length of each encoding unit may be defined in a system, or may be agreed upon by the transmit end and the receive end. This is not limited in this embodiment of this application.

In some embodiments, each time the PCS layer receives a frame, the PCS layer may encode the frame, and send an encoding unit generated by encoding. After a frame is received, the frame is encoded and sent. Therefore, a delay is low. However, one frame corresponds to one encoding unit. If a data amount of the frame is small, carrying efficiency of the encoding unit is low, and encoding overheads are high. To improve carrying efficiency of the encoding unit, a plurality of small frames may be spliced into one long frame, and the long frame is mapped to one encoding unit. Alternatively, it may be understood that when a length of a frame received by the PCS layer is less than a length of an encoding unit, the PCS layer may continue to receive another frame, and then map a plurality of received frames to one encoding unit. For example, the PCS layer receives L frames, and encodes the L frames to generate M encoding units. L is greater than or equal to 2, and M is greater than or equal to 1. Because the L frames are encoded together, carrying efficiency of the encoding unit can be improved, and encoding overheads can be reduced. It should be noted that the L frames may include frames of a same type, or may include frames of a plurality of types. This is not limited in this embodiment of this application.

In an example, the PCS layer may segment the L frames to obtain a plurality of data units, and map the plurality of data units to the M encoding units. It is considered that the receive end receives the M encoding units, decodes the M encoding units, and then obtains the plurality of data units, data units that belong to a same frame need to be determined from the plurality of data units. The PCS layer segments the L frames, and the L frames may be divided based on data information and control information. It should be understood that, for a frame, the control information usually indicates information such as a length of the frame, a source address of the frame, and a destination address of the frame, and may be considered as a frame header of the frame. Relatively speaking, the data information may be a frame body and a frame tail of the frame. The control information is less than the data information. Therefore, the control information may be divided into one data unit, and the data information may be divided into a plurality of data units. It should be noted herein that when a length of the control information is greater than a length of a data unit, a part of data of the control information may be divided into a data unit, and the remaining part of the control information is divided together with the data information. In this way, the receive end may delimit a plurality of data units based on the control information, that is, determine a start location of a frame, to determine data blocks that belong to a same frame. For ease of distinguishing, in the following, a data unit obtained by dividing control information is referred to as a control block (control block) or a frame header, and a data unit obtained by dividing data information is referred to as a data block (data block) or a valid payload. That is, the PCS layer divides the L frames into a plurality of control blocks and a plurality of data blocks.

The PCS layer maps the plurality of control blocks and the plurality of data blocks that are obtained by dividing the L frames to the M encoding units, and sends the M encoding units to the receive end. The receive end needs to determine, from the received M encoding units, a control block and a data block that belong to a same frame, that is, correctly decode the M encoding units, to obtain correct L frames. To enable the receive end to correctly decode the M encoding units, the transmit end may specify a start location of a control block in the encoding unit. In this way, the receive end delimits a plurality of data blocks based on the start location of the control block in the encoding unit. It should be understood that a length of each of the M encoding units is fixed, and some of the L frames are long, and some of the L frames are short. If one frame corresponds to one encoding unit, it is clear that a large length of each encoding unit indicates high overheads. If a length of a frame is greater than a length of an encoding unit, mapping of one frame cannot be completed in one encoding unit. Therefore, in this embodiment of this application, one frame can be mapped to a plurality of encoding units, to reduce overheads of the encoding unit as much as possible. This means that in the M encoding units, some encoding units may include a frame header and a data block, and some encoding units may include a data block and do not include a frame header. In this case, structures of different types of encoding units in the M encoding units may be the same or different.

To enable the receive end to distinguish between a unit with a frame header and a unit without a frame header in the received M encoding units, the transmit end may indicate, based on the first identifier, whether the unit includes a frame header. Further, even if the receive end determines that a unit includes a frame header, but the receive end cannot determine a start location of the frame header in the unit, the receive end still cannot determine an accurate frame header from the unit, that is, cannot determine which data blocks in the encoding unit belong to a same frame. Therefore, the first identifier may further indicate a start location that is in a unit and that is of a frame header in the unit. In this way, the receive end may delimit, based on the first identifier, a frame included in the received M encoding units. It should be understood that, if a unit does not include a frame header, the unit may not need to carry the first identifier, to improve data carrying efficiency of the unit. For ease of description, in the following, an encoding unit that includes the first identifier is referred to as a first-type unit, and an encoding unit that does not include the first identifier is referred to as a second-type unit. It should be understood that structures of the first-type unit and the second-type unit may be different.

The M encoding units may include at least one first-type unit, or the M encoding units include at least one first-type unit and at least one second-type unit. A manner of mapping the plurality of control blocks and the plurality of data blocks that are obtained by dividing the L frames to the M encoding units varies based on a structure form of the encoding unit. The following describes, with reference to several possible implementations of the encoding unit, how the PCS layer maps the plurality of control blocks and the plurality of data blocks to the M encoding units.

Figure 5:
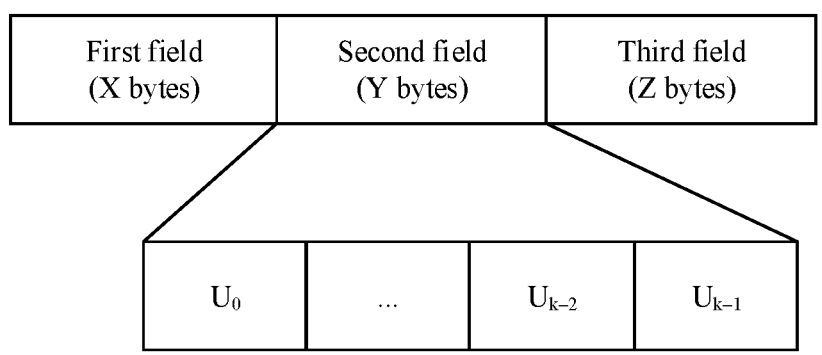
FIG. 5 is a schematic diagram of a frame structure of a first-type unit according to an embodiment of this application.

Implementation 1: FIG. 5 shows a frame structure of a first-type unit. The first-type unit includes a first field, a second field, and a third field. The first field is used for carrying a first identifier. The second field is used for carrying a frame header and data of a first frame. The third field is used for carrying check information for checking the first-type unit. The first frame may be any one of L frames.

Usually, the first identifier indicates a start location that is in a first-type unit and that is of the frame header of the first frame, and occupies a few bits or bytes (byte). The second field is used for carrying the frame header and the data, and needs to occupy a large quantity of bits or bytes. The third field is used for carrying the check information for checking the first-type unit. The check information may be check information of the first frame, for example, may be a frame check sequence (frame check sequence, FCS) code. Therefore, compared with the second field, the third field occupies fewer bits or bytes. For ease of description, in FIG. 5, an example in which the first field occupies X bytes, the second field occupies Y bytes, and the third field occupies Z bytes is used. However, lengths of the first field, the second field, and the third field are not limited in this embodiment of this application.

In this embodiment of this application, the second field may be divided into a plurality of subfields. For example, the second field may include K subfields (that is, $U_0$ to $U_{k-1}$), and K is greater than or equal to 2. In this way, a start location of each subfield is a reference point, and clearly indicates the start location that is in the first-type unit and that is of the frame header of the first frame. For example, the frame header of the first frame may be located in any one of the K subfields. For example, it may be specified that the start location of the frame header of the first frame is the start location of the subfield. In this way, a transmit end indicates a subfield in which the frame header of the first frame is located, and a receive end may determine a correct frame header. Alternatively, it may be specified that there is a first offset between the start location of the frame header of the first frame and the start location of the subfield. In this way, the transmit end indicates a subfield in which the frame header of the first frame is located, and the receive end may also determine a correct frame header. A granularity of the first offset is not limited in this embodiment of this application. For example, the granularity of the first offset may be bits or bytes. Another subfield in the K subfields other than the subfield carrying the frame header may be used for carrying a payload and check information. The payload includes a valid payload in a frame body, or may include a valid payload in a frame tail, a control frame, or an idle code block.

Figure 6B:
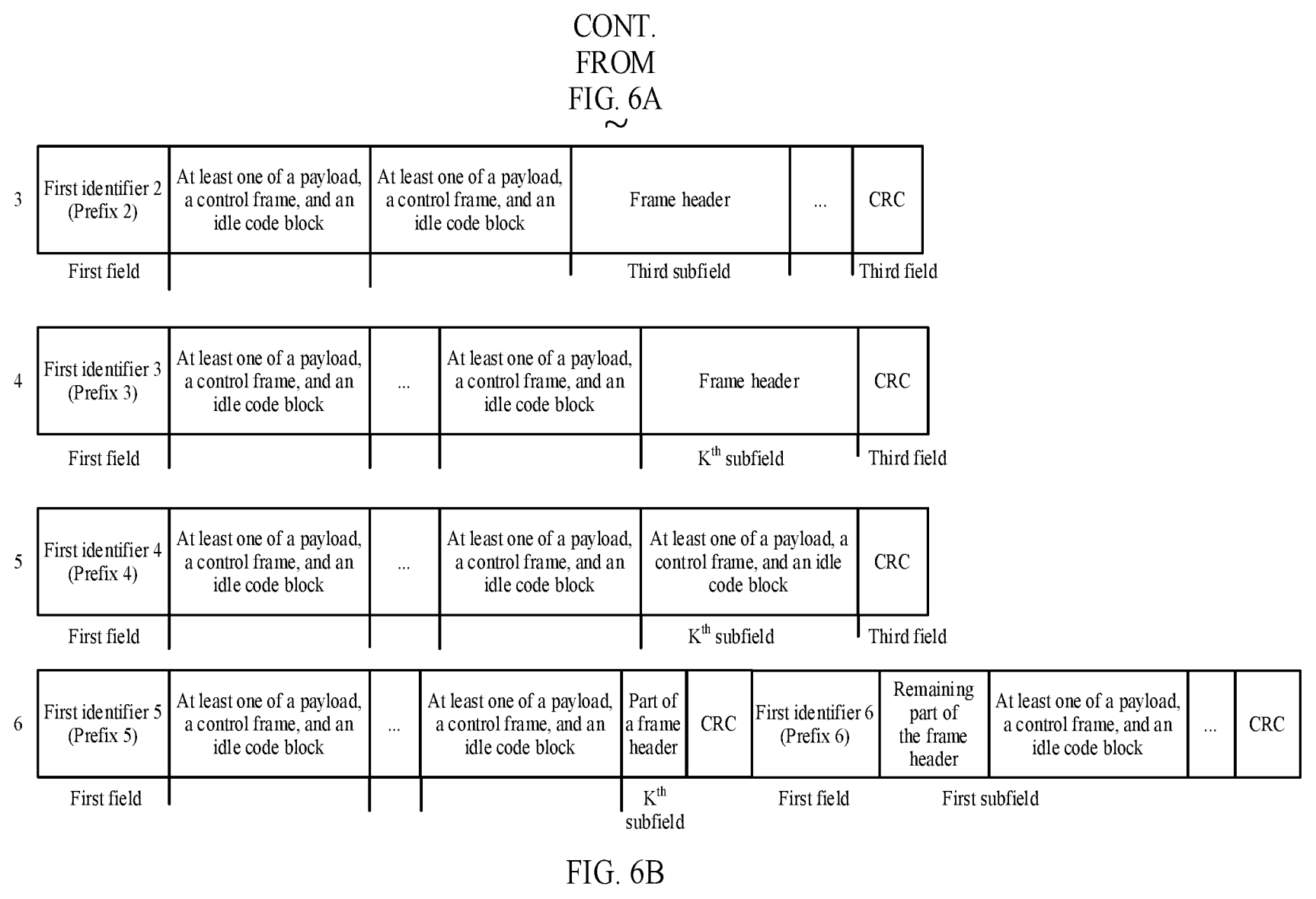

FIG. 6A and FIG. 6B show a mapping mode of mapping a first frame to a first-type unit. A frame header of the first frame may be mapped to any subfield in a second field in the first-type unit. A first identifier carried in a first field may indicate a location of the frame header in the first-type unit. Different values of the first identifier correspond to different locations. In a first mapping mode shown in FIG. 6A and FIG. 6B, the frame header of the first frame may be located in a first subfield, and a value of the first identifier may be a first value. In a second mapping mode shown in FIG. 6A and FIG. 6B, the frame header of the first frame may be located in a second subfield, and a value of the first identifier may be a second value. In a third mapping mode shown in FIG. 6A and FIG. 6B, the frame header of the first frame may be located in a third subfield, and a value of the first identifier may be a third value. In a fourth mapping mode shown in FIG. 6A and FIG. 6B, the frame header of the first frame may be located in a $K^{th}$ field, and a value of the first identifier may be a fourth value. In a fifth mapping mode shown in FIG. 6A and FIG. 6B, the first-type unit may not include the frame header of the first frame, and a value of the first identifier may be a fifth value. It should be understood that a length of the first field may be determined based on K. For example, the first field may occupy at least $\log_2^K$ bits.

It should be noted that, in FIG. 6A and FIG. 6B, the first identifier is located before a valid payload. Therefore, the first identifier may also be referred to as a preceding identifier (prefix). It should be noted that a location of the first identifier is not limited in this embodiment of this application. For example, the first identifier may also be located at a tail of the first-type unit. In the following, an example in which the first identifier is a preceding identifier is used.

In this embodiment of this application, the second field may be divided into K subfields with a same length, or the second field may be divided into subfields with different lengths. That is, the K subfields each occupy a same quantity of bits, or at least two of the K subfields occupy different quantities of bits, to improve flexibility of carrying a payload.

Usually, there are two types of frames sent by an upper layer to a PCS layer: a control frame and a data frame. The control frame has only a frame header (Header). The data frame includes a frame header, a frame body (body), and a frame tail (tail). The frame body is usually a valid payload in body (payload in body), and the frame tail may include a valid payload (payload in tail) and an FCS. The frame header is usually short. Therefore, the frame header may be mapped to a subfield, for example, the first subfield, in the K subfields in the first-type unit. From this perspective, a length of any subfield may be determined based on a maximum length of the frame header. For example, the length of the subfield may be equal to the maximum length of the frame header. A valid payload and check information in the first frame may be carried in another subfield other than the first subfield. Certainly, if there is remaining space after the first subfield carries the frame header, the remaining space may also carry the valid payload and the check information of the first frame. The first field may be any subfield of the K subfields, and one first-type unit may be used for carrying a plurality of frames. A receive end may determine a start location of each frame based on the first identifier in at least one first-type unit, to delimit a frame.

However, if a $K^{th}$ subfield is insufficient to carry all information about the frame header of the first frame, the $K^{th}$ subfield may be used for carrying a part of information about the frame header of the first frame, for example, a sixth mapping mode shown in FIG. 6A and FIG. 6B. Remaining information of the frame header of the first frame may be carried in a subfield in another first-type unit.

Figure 9A:
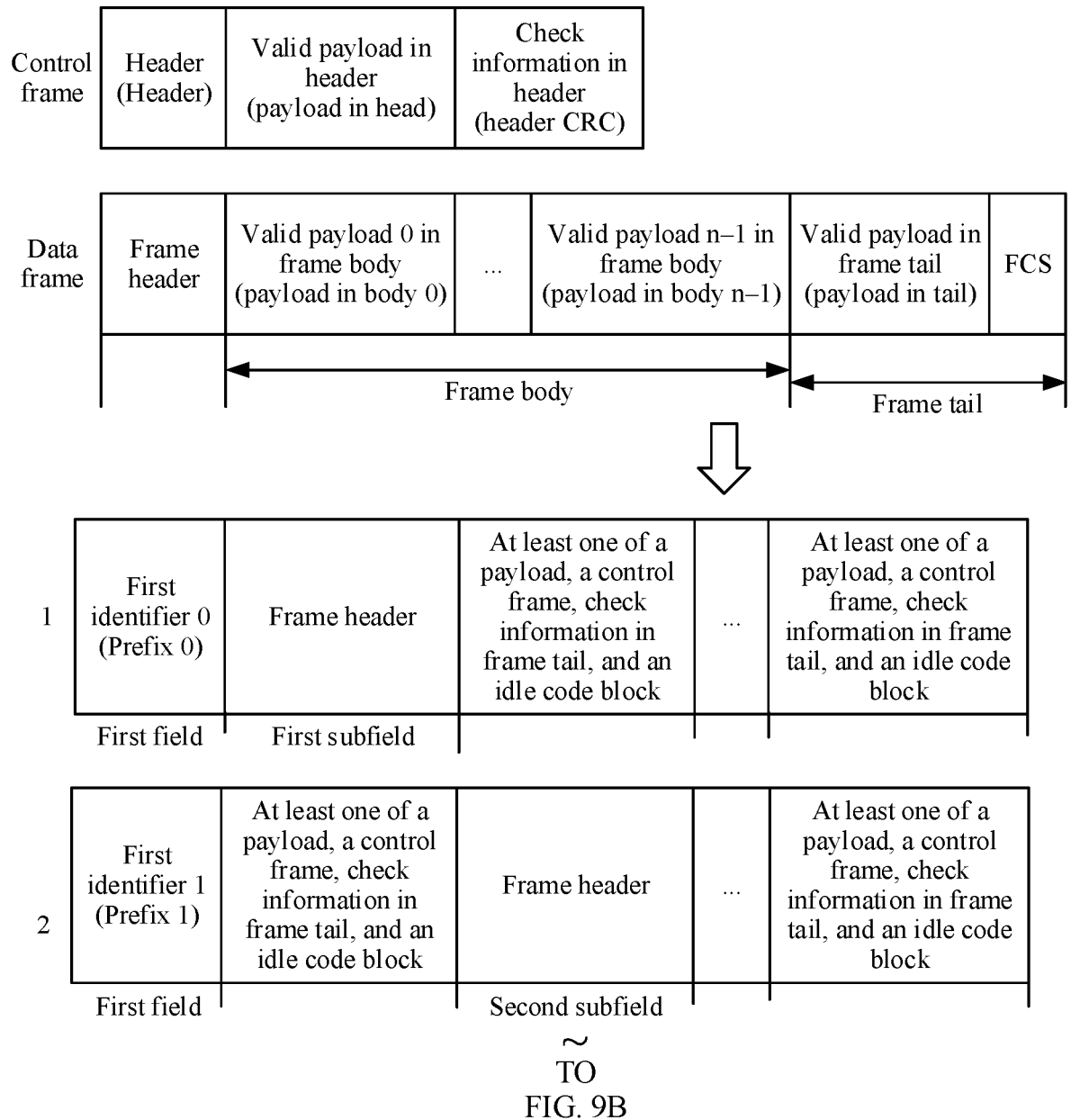

Certainly, it is considered that a length of the first frame is greater than a length of the first-type unit, mapping of the first frame cannot be completed in one first-type unit, that is, the first frame may be mapped to a plurality of first-type units. However, one of the plurality of first-type units may be used for carrying the frame header of the first frame, and remaining first-type units may be used for carrying data included in the first frame. If a structure shown in FIG. 9A and FIG. 9B is still used, the remaining first-type units may be mapped in the fifth mapping mode shown in FIG. 6A and FIG. 6B, that is, the first identifier indicates that the first-type unit does not include the preceding identifier.

To improve carrying efficiency of the encoding unit, in an alternative solution, the remaining first-type units may not carry the first identifier. For example, the first field may be used for carrying data. For ease of distinguishing, in this specification, an encoding unit that does not include the first identifier is referred to as a second-type unit. It should be understood that a frame may be mapped to a first-type unit and one or more second-type units. Because the one or more second-type units do not include the first identifier, the receive end needs to determine a frame to which the received valid payload carried by the one or more second-type units belongs. If the first identifier is located before the valid payload, the receive end may determine that a valid payload carried by a second-type unit belongs to a frame corresponding to a first identifier in a first-type unit preceding the second-type unit; or the receive end may determine that valid payloads carried by a plurality of consecutive second-type units belong to a frame corresponding to a first identifier in a first-type unit preceding the plurality of consecutive second-type units.

Figure 7A:
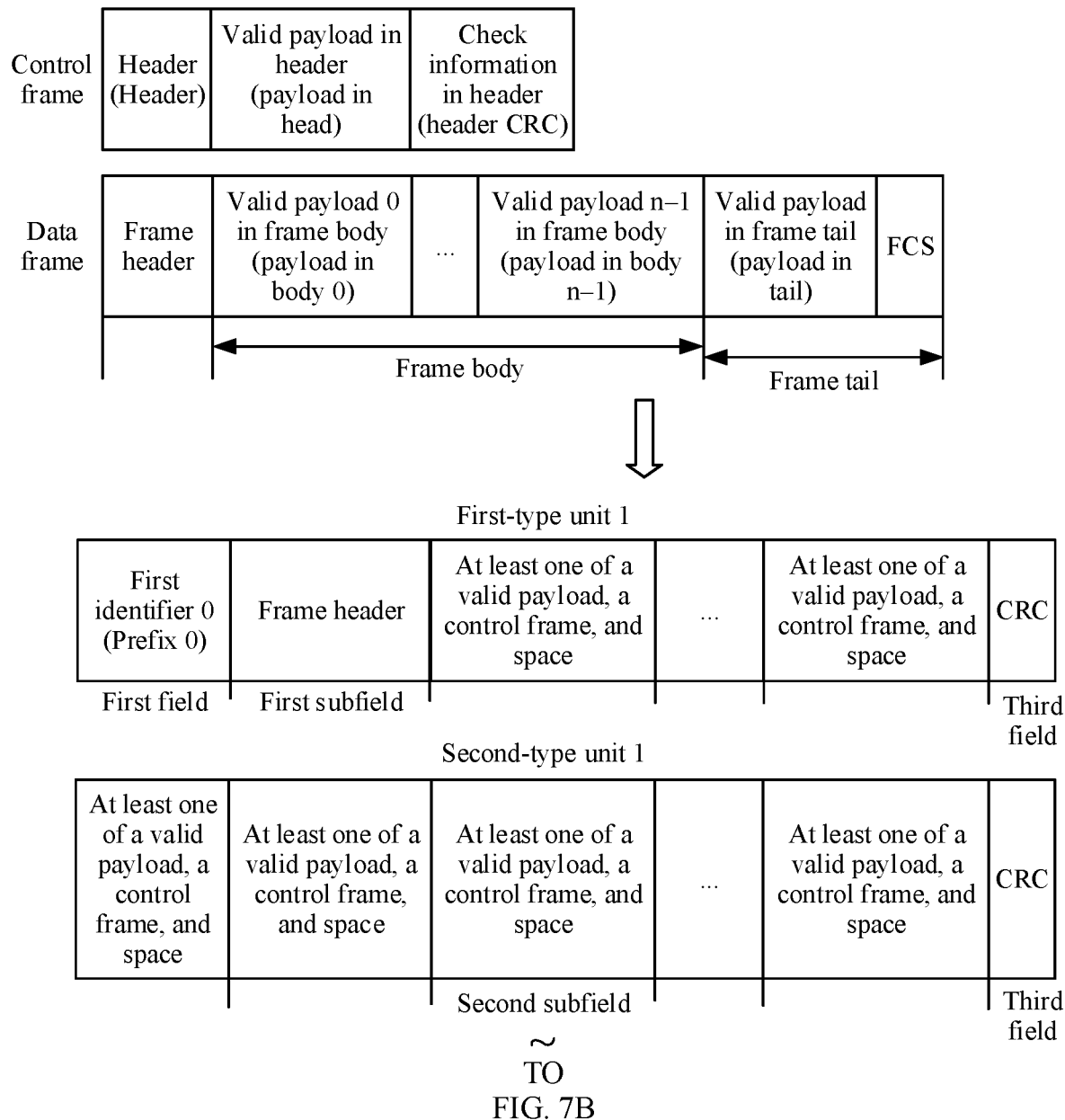

For example, FIG. 7A and FIG. 7B show a mapping mode of mapping L frames to M encoding units. It should be understood that the M encoding units include at least one first-type unit and at least one second-type unit. In FIG. 7A and FIG. 7B, an example in which three first-type units and two second-type units are included is used. A first field in a first-type unit 1, a first-type unit 2, and a first-type unit 3 carries a first identifier. A second-type unit 1 and a second-type unit 2 do not carry a frame header. A first field in the second-type unit 1 and the second-type unit 2 carries at least one of a payload, a control frame, and an idle code block. It should be understood that payloads carried by the second-type unit 1 and the second-type unit 2 belong to frames corresponding to frame headers in the first-type unit 1. When a receive end receives five units in FIG. 7A and FIG. 7B, it may be considered that payloads carried by the second-type unit 1 and the second-type unit 2 that do not carry the frame header belong to frames to which frame headers corresponding to first identifiers in a first-type unit preceding the payloads belong. Because the first field in the second-type unit 1 and the second-type unit 2 is used for carrying the payload, carrying efficiency of the encoding unit can be improved.

In this embodiment of this application, the valid payload and the check information of the L frames are mapped to the plurality of first-type units, that is, check of the first-type units is performed at a physical layer. In this way, operations such as flow control and retransmission of a frame can be performed at the physical layer. Operations such as flow control and retransmission of a frame are performed by using an encoding unit at a physical layer as a granularity, to improve operation efficiency, and reduce a delay. Compared with the conventional method, to be specific, operations such as flow control and retransmission of a frame are performed at a data link layer (data link layer), in this method, it is clear that a delay is lower and transmission efficiency is higher. In addition, in this embodiment of this application, the first identifier (the preceding identifier) is inserted into the encoding unit to identify a start location of each frame, to ensure correct recovery of the L frames at the receive end.

Figure 8:
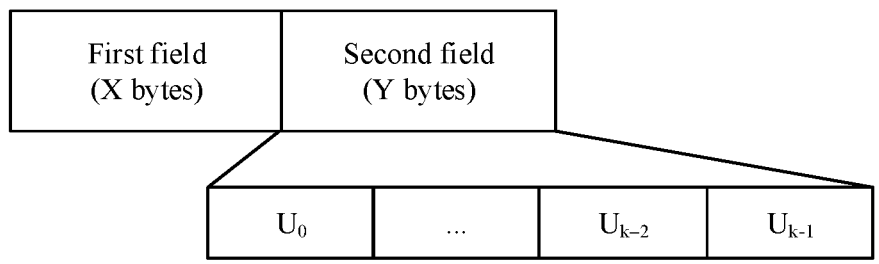
FIG. 8 is a schematic diagram of another frame structure of a first-type unit according to an embodiment of this application.

Implementation 2: FIG. 8 shows a frame structure of a first-type unit. The first-type unit includes a first field and a second field. That is, a difference from the implementation 1 lies in that the first-type unit does not include a third field, that is, no check bit is separately set in an encoding unit. In this case, check information of L frames may be included in an upper-layer packet, and is carried in a payload field together with data in the L frames. In this case, reliability of a payload carried by the first-type unit is ensured by a check bit carried in an upper-layer frame. This solution can further compress overheads of the encoding unit and improve carrying efficiency of the encoding unit.

It should be noted that, for implementation of the first field included in the first-type unit herein, refer to implementation of the first field in the first-type unit in the implementation 1. Similarly, in the implementation 2, for implementation of the second field included in the first-type unit, refer to implementation of the second field in the first-type unit in the implementation 1. Details are not described herein again.

For example, FIG. 9A and FIG. 9B show a mapping mode of mapping a frame to a first-type unit. In FIG. 9A and FIG. 9B, an example in which L frames are mapped to five first-type units is used. As shown in FIG. 9A and FIG. 9B, a difference from FIG. 6A and FIG. 6B lies in that, in K subfields included in a second field, a subfield used for carrying data may carry a valid payload in a frame body and a frame tail. It should be understood that the frame tail includes a valid payload and check information in the frame tail, for example, an FCS. Certainly, the subfield used for carrying data may also carry a control frame, an idle code block, or the like. For example, a subfield in the first-type unit may be used for carrying at least one of a valid payload in a frame body, a control frame, and a frame tail.

It should be noted that, in this embodiment of this application, a part of M encoding units may use a structure in the implementation 1, and the other encoding units may use a structure in the implementation 2. The encoding unit in the implementation 1 carries check information, and reliability of a frame header in the encoding unit may be ensured by using the check information. The encoding unit in the implementation 2 may be configured to improve carrying efficiency of data other than a frame header in the encoding unit, and is more applicable to an application scenario of a long frame.

Figure 10A:
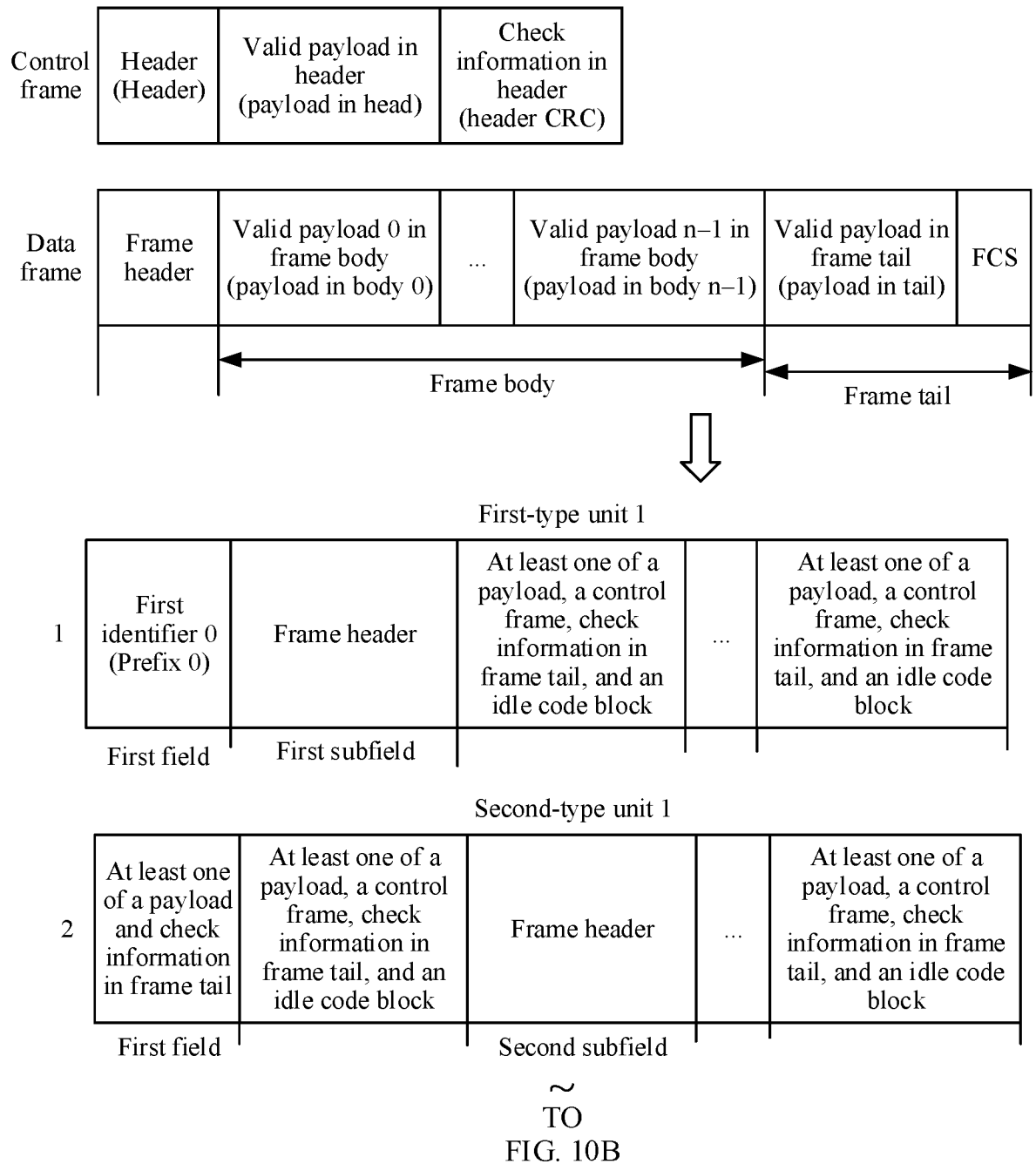

In the structure of the implementation 2, one frame may alternatively be mapped to one first-type unit and at least one second-type unit. For example, FIG. 10A and FIG. 10B show a schematic diagram of mapping a frame to an encoding unit. In FIG. 10A and FIG. 10B, an example in which three first-type units and two second-type units are included is used. A first field in a first-type unit 1, a first-type unit 2, and a first-type unit 3 carries a first identifier. A second-type unit 1 and a second-type unit 2 do not carry a frame header. A first field in the second-type unit 1 and the second-type unit 2 carries at least one of a payload, a control frame, a frame tail, and an idle code block. It should be understood that payloads carried by the second-type unit 1 and the second-type unit 2 belong to frames corresponding to frame headers in the first-type unit 1. When a receive end receives five units in FIG. 10A and FIG. 10B, it may be considered that payloads carried by the second-type unit 1 and the second-type unit 2 that do not carry the frame header belong to frames to which frame headers corresponding to first identifiers preceding the payloads belong. Because the first field in the second-type unit 1 and the second-type unit 2 is used for carrying a payload, carrying efficiency of the encoding unit can be improved, and the encoding unit is more applicable to long frame transmission. In addition, the first-type unit and the second-type unit do not include a third field, to reduce overheads of the M encoding units.

Figure 11:
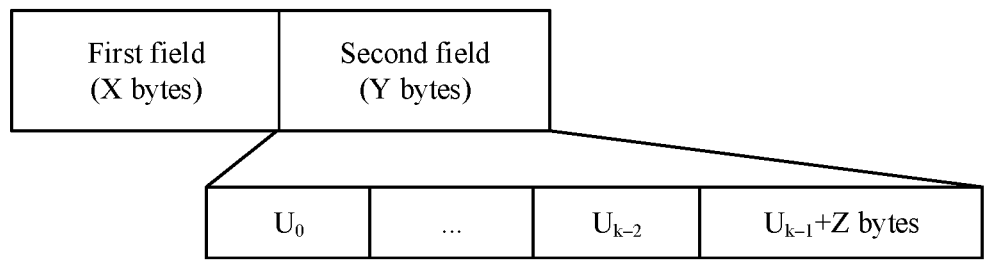
FIG. 11 is a schematic diagram of still another frame structure of a first-type unit according to an embodiment of this application.

Implementation 3: FIG. 11 shows a frame structure of a first-type unit. The first-type unit includes a first field and a second field. The first field is used for carrying a first identifier. The second field is used for carrying a frame header and data of a first frame. A difference from the foregoing implementation 1 and implementation 2 lies in that a $K^{th}$ subfield in the second field may be extended by Z bytes. It may be understood that the third field in the structure in the implementation 1 is used for carrying data. Because the field used for carrying the check information may be used for carrying data, overheads of the encoding unit may be further compressed. In addition, data carrying efficiency of the encoding unit may be further improved.

Figures 12A, 12B:
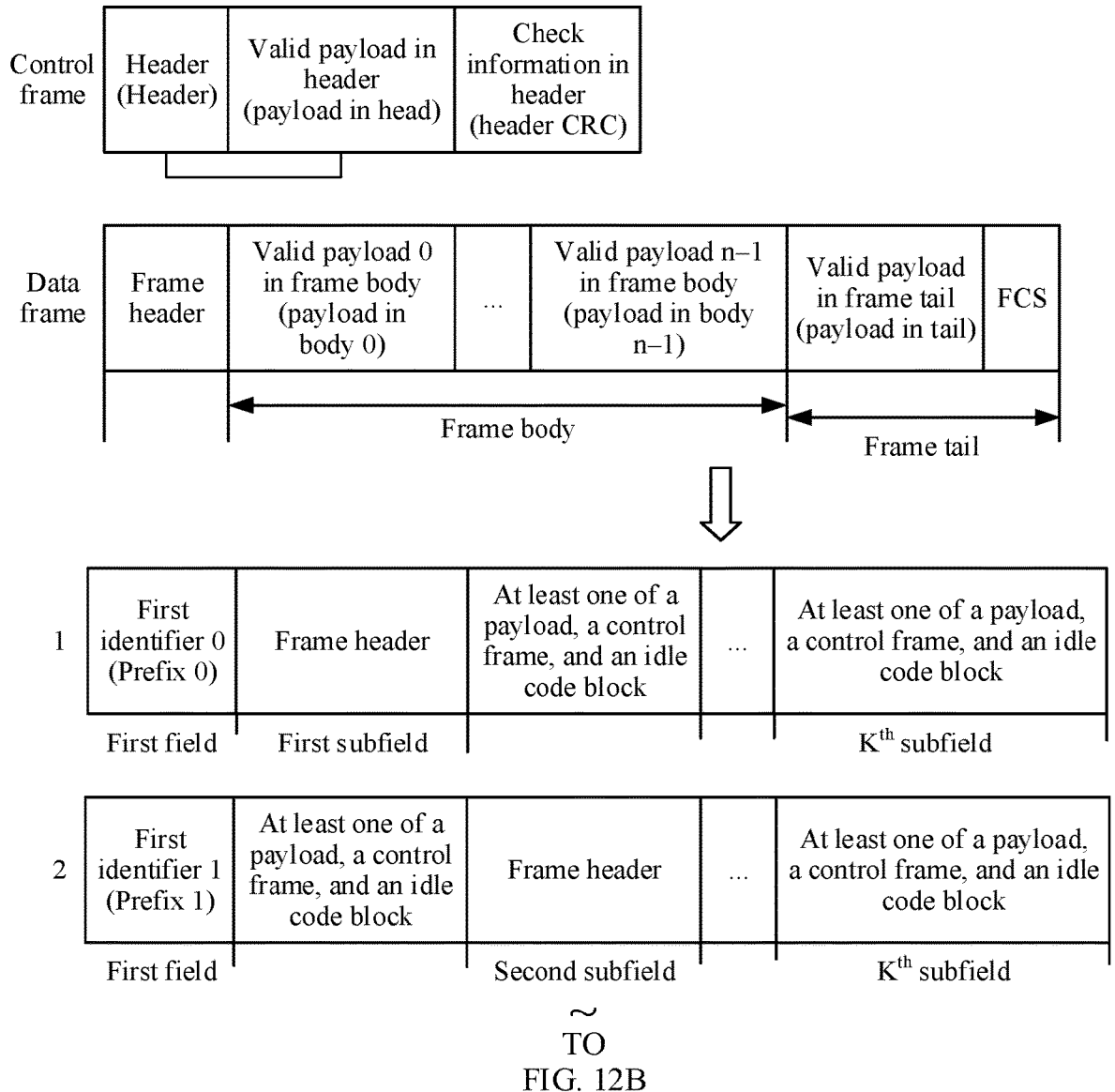
FIG. 12A and FIG. 12B are a schematic diagram of a mapping mode of mapping a first frame to a plurality of first-type units according to an embodiment of this application.

For example, FIG. 12A and FIG. 12B show a mapping mode of mapping a frame to a plurality of first-type units. In FIG. 12A and FIG. 12B, an example in which L frames are mapped to five first-type units is used. As shown in FIG. 12A and FIG. 12B, a difference from FIG. 6A and FIG. 6B lies in that Z bytes are extended in K subfields included in a second field, to carry at least one of a valid payload in a frame body, a control frame, and an idle code block in a frame tail.

It should be noted that, in this embodiment of this application, a part of M encoding units may use a structure in the implementation 1, and the other encoding units may use a structure in the implementation 3. The encoding unit in the implementation 1 carries check information, and reliability of a frame header in the encoding unit may be ensured by using the check information. The encoding unit in the implementation 3 may be configured to improve carrying efficiency of data other than a frame header in the encoding unit, and is more applicable to an application scenario of a long frame.

In some embodiments, the first field in the implementation 3 may be used for carrying data, to improve data carrying efficiency of the encoding unit. That is, the encoding unit may alternatively be implemented in an implementation 4.

Figure 13:
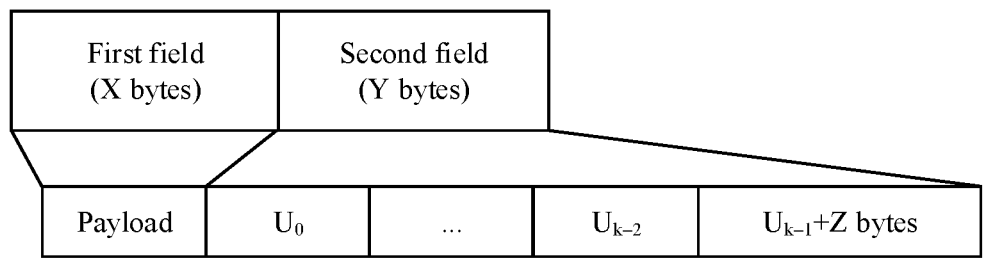
FIG. 13 is a schematic diagram of a frame structure of a second-type unit according to an embodiment of this application.

Implementation 4: FIG. 13 shows a frame structure of a second-type unit. The second-type unit includes a first field and a second field. A difference from the implementation 3 lies in that the first field is used for carrying data. Because the field used for carrying the first identifier carries the data, overheads of the encoding unit may be further compressed.

Figure 14A:
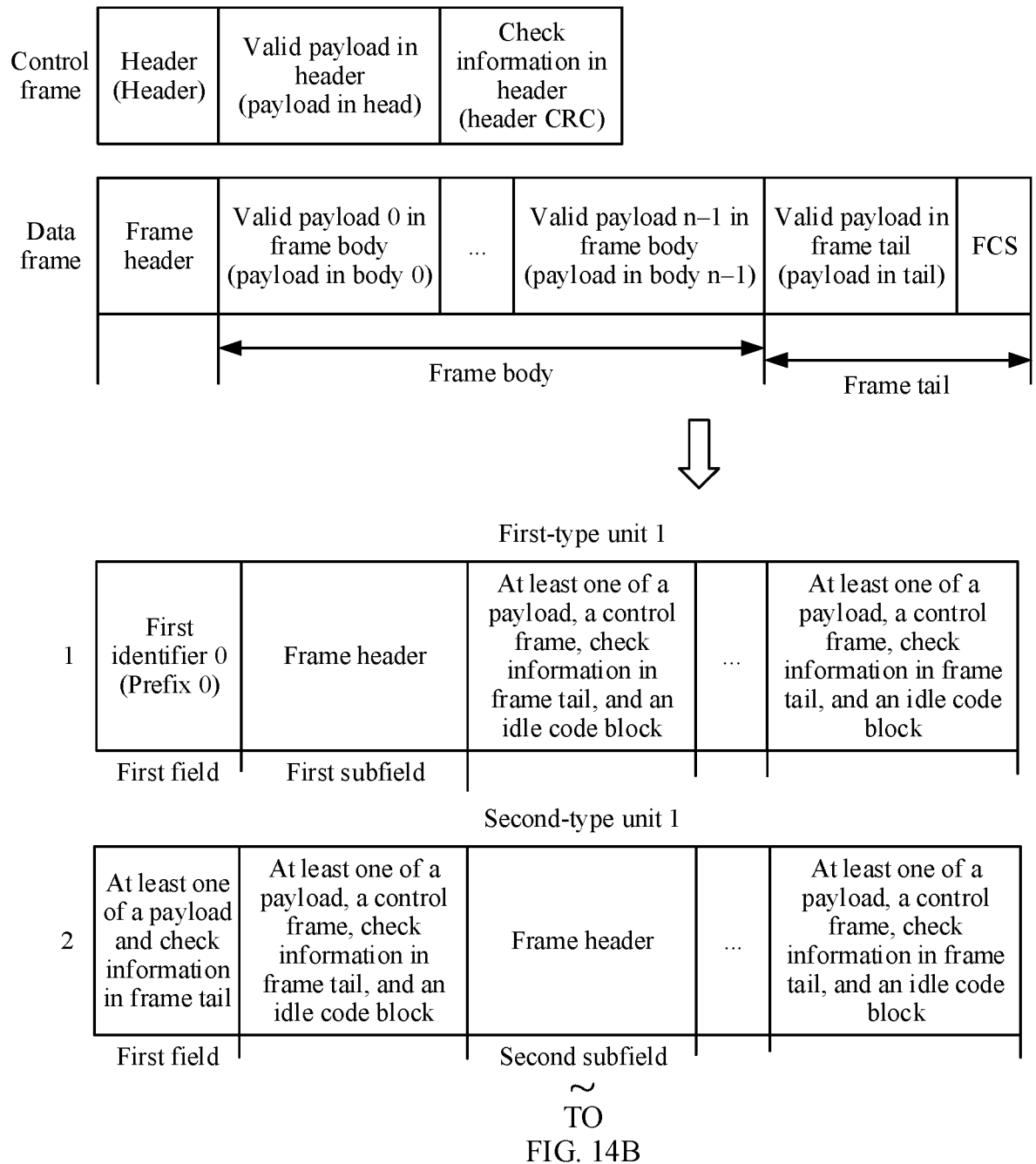

For example, FIG. 14A and FIG. 14B show a mapping mode of mapping a frame to a plurality of first-type units and second-type units. In FIG. 14A and FIG. 14B, an example in which L frames are mapped to three first-type units and two second-type units is used. A first field in a first-type unit 1, a first-type unit 2, and a first-type unit 3 carries a first identifier. A second-type unit 1 and a second-type unit 2 do not carry a frame header. A first field in the second-type unit 1 and the second-type unit 2 carries at least one of a payload, a control frame, a frame tail, and an idle code block. It should be understood that payloads carried by the second-type unit 1 and the second-type unit 2 belong to frames corresponding to frame headers in the first-type unit 1. When a receive end receives five units in FIG. 14A and FIG. 14B, it may be considered that payloads carried by the second-type unit 1 and the second-type unit 2 that do not carry the frame header belong to frames to which frame headers that are located between the second-type units 1 and that correspond to first identifiers preceding the payloads belong. The first field in the second-type unit 1 and the second-type unit 2 is used for carrying a payload, and a field used for carrying check information may be used for carrying data. Therefore, overheads of the encoding unit may be further compressed, data carrying efficiency of the encoding unit is improved, and the encoding unit is applicable to long frame transmission.

Several possible structures of the encoding unit are described above. In this embodiment of this application, mapping L frames to M encoding units may use one or more structures in the foregoing implementation 1 to implementation 4. Insertion of the first identifier may delimit a frame. In addition, insertion of the first identifier can also control a quantity of consecutive "0"s or consecutive "1"s in the system. For example, the quantity of consecutive "0"s or consecutive "1"s is controlled within a length of each encoding unit, to ensure that a clock recovery circuit at a receive end works normally and avoid data loss.

In this embodiment of this application, the first identifier may further indicate a type of a frame header, that is, a type of a frame to which the frame header belongs. The type herein may be a service type, or may be a protocol type of an encapsulated frame. Usually, different services correspond to different encapsulation protocols. Therefore, it may also be considered that the first identifier may be used for service isolation. Because the first identifier may be used for identifying a type of a frame, different services corresponding to the L frames may be distinguished based on the first identifier. In this way, the L frames may be flexibly mapped to the M encoding units, to isolate a plurality of services. The receive end may determine an encapsulation protocol of each frame based on the first identifier, and parse the L frames. This can simplify an upper-layer data processing procedure on a receive side, and reduce a service data transmission delay.

In a possible implementation, the first identifier may be generated by using error correction and detection encoding. For example, the first identifier may be generated by using an eBCH code word or a BCH code word. Because error correction and detection encoding has an error correction and detection capability, the first identifier may be protected by using the error correction and detection encoding itself, and the first identifier does not need to be protected based on other information. This can ensure reliability of the first identifier, and avoid a misjudgment of a frame format by the receive end.

It should be understood that, after data is encoded, the data needs to be modulated before being sent to the receive end. For example, an NRZ modulation scheme or a PAM4 modulation scheme may be used. To ensure DC balance, a valid payload of the encoding unit is usually scrambled. For example, 64b/66b encoding uses NRZ modulation, and a 64-bit valid payload is scrambled based on a self-synchronizing scrambling manner of $X^{58}+X^{39}+1$. For another example, 128b/130b encoding uses NRZ modulation, and satisfies DC balance by introducing scrambling codes into data. For another example, 256b/257b transcoding satisfies DC balance by adding scrambling codes to encoded data. However, because scrambling is performed on a valid payload, that is, a 2-bit synchronization header in 64b/66b encoding and 128b/130b encoding, or a $zero^{th}$ bit or a $zero^{th}$ bit to a fifth bit in 256b/257b transcoding are not scrambled, good DC balance cannot be satisfied.

Therefore, the first identifier itself may satisfy DC balance through encoding design, that is, the first identifier itself provided in this embodiment of this application may satisfy DC balance. Even if a valid payload in the encoding unit is scrambled, DC balance can still be satisfied for the entire encoding unit. For example, the first identifier includes X bits, and the X bits satisfy direct current balance in a PAM4 modulation scheme. For another example, the first identifier includes X bits, and the X bits satisfy direct current balance in an NRZ modulation scheme, or the X bits satisfy direct current balance in an NRZ modulation scheme and a PAM4 modulation scheme.

In an example, error correction and detection encoding is an eBCH code word whose code length is 16 bits, and a minimum Hamming distance of the eBCH code word is eight. The eBCH code word can satisfy DC balance in NRZ modulation. It should be understood that there are 32 eBCH code words whose code length is 16 bits and whose minimum Hamming distance is eight. The 32 eBCH code words are shown in Table 1.

TABLE 1

Correspondence between an eBCH code word and a first identifier

| Code word No. | Original eBCH code word | Identifier |
|---|---|---|
| 0 | 00000000_00000000 | 00000000_00000000 |
| 1 | 00001010_01101111 | 01000100_01011111 |
| 2 | 00010100_11011101 | 10100000_10111011 |
| 3 | 00011110_10110010 | 11100100_11100100 |
| 4 | 00100011_11010110 | 00001101_10101110 |
| 5 | 00101001_10111001 | 01001001_11110001 |
| 6 | 00110111_00001011 | 10101101_00010101 |
| 7 | 00111101_01100100 | 11101001_01001010 |
| 8 | 01000111_10101100 | 00100111_11011000 |
| 9 | 01001101_11000011 | 01100011_10000111 |
| 10 | 01010011_01110001 | 10000111_01100011 |
| 11 | 01011001_00011110 | 11000011_00111100 |
| 12 | 01100100_01111010 | 00101010_01110110 |
| 13 | 01101110_00010101 | 01101110_00101001 |
| 14 | 01110000_10100111 | 10001010_11001101 |
| 15 | 01111010_11001000 | 11001110_10010010 |
| 16 | 10000101_00110111 | 00110001_01101101 |
| 17 | 10001111_01011000 | 01110101_00110010 |
| 18 | 10010001_11101010 | 10010001_11010110 |
| 19 | 10011011_10000101 | 11010101_10001001 |
| 20 | 10100110_11100001 | 00111100_l1000011 |
| 21 | 10101100_10001110 | 01111000_10011100 |
| 22 | 10110010_00111100 | 10011100_01111000 |
| 23 | 10111000_01010011 | 11011000_00100111 |

TABLE 1-continued

Correspondence between an eBCH code word and a first identifier

| Code word No. | Original eBCH code word | Identifier |
|---|---|---|
| 24 | 11000010_10011011 | 00010110_10110101 |
| 25 | 11001000_11110100 | 01010010_11101010 |
| 26 | 11010110_01000110 | 10110110_00001110 |
| 27 | 11011100_00101001 | 11110010_01010001 |
| 28 | 11100001_01001101 | 00011011_00011011 |
| 29 | 11101011_00100010 | 01011111_01000100 |
| 30 | 11110101_10010000 | 10111011_10100000 |
| 31 | 11111111_11111111 | 11111111_11111111 |

Each eBCH code word in Table 1 may be separately used for generating an identifier, as shown in Table 1. The first identifier in this embodiment of this application may alternatively be a part of identifiers in Table 1. To be specific, the first identifier includes 16 bits, and the 16 bits may be a part of code words in Table 1, to satisfy DC balance in an NRZ modulation scheme, or satisfy DC balance in a PAM4 modulation scheme, or satisfy an NRZ modulation scheme and a PAM4 modulation scheme.

In an example, the first identifier may include a code word shown in Table 2.

TABLE 2

| Code word No. | Original eBCH code word | First identifier (NRZ modulation) |
|---|---|---|
| 3 | 00011110_10110010 | 11100100_11100100 |
| 8 | 01000111_10101100 | 00100111_11011000 |
| 9 | 01001101_11000011 | 01100011_10000111 |
| 10 | 01010011_01110001 | 10000111_01100011 |
| 11 | 01011001_00011110 | 11000011_00111100 |
| 20 | 10100110_11100001 | 00111100_11000011 |
| 21 | 10101100_10001110 | 01111000_10011100 |
| 22 | 10110010_00111100 | 10011100_01111000 |
| 23 | 10111000_01010011 | 11011000_00100111 |
| 28 | 11100001_01001101 | 00011011_00011011 |

It can be learned from Table 2 that the eBCH code word corresponding to the first identifier is actually 10 code words in Table 1. Because a quantity of "0"s and a quantity of "1"s in first eight bits of the first identifier in Table 2 are the same, and a quantity of "0"s and a quantity of "1"s in last eight bits are the same, the first identifier in Table 2 satisfies DC balance in an NRZ modulation scheme.

Further, the first identifier may be obtained by adjusting a bit sequence of the eBCH code word according to a preset rule, to satisfy DC balance in a PAM4 modulation scheme. For example, a possible preset rule is that a sequence "43275160" of the first eight bits of the original eBCH code word corresponds to a sequence "76543210" of the first eight bits of the first identifier, and a sequence "75432160" of the last eight bits of the original eBCH code word corresponds to a sequence "76543210" of the first eight bits of the first identifier. That is, a fourth bit of the first eight bits of the original eBCH code word is used as a seventh bit of the first eight bits of the first identifier, a third bit of the first eight bits of the original eBCH code word is used as a sixth bit of the first eight bits of the first identifier, and so on. The first identifier shown in Table 3 may be obtained according to the foregoing preset rule. A bit sequence "76543210_76543210" of the first identifier in Table 3 corresponds to a bit sequence "43275160_75432160" of the original eBCH code word.

TABLE 3

| Code word No. | Original eBCH code word (76543210_76543210) | (43275160_75432160) First identifier (NRZ modulation) (76543210_76543210) | First identifier (PAM4 modulation) |
|---|---|---|---|
| 3 | 00011110_10110010 | 11100100_11100100 | 2310_2310 |
| 8 | 01000111_10101100 | 00100111_11011000 | 0312_2130 |
| 9 | 01001101_11000011 | 01100011_10000111 | 1302_3012 |
| 10 | 01010011_01110001 | 10000011_01100011 | 3012_1302 |
| 21 | 10101100_10001110 | 01111000_10011100 | 1230_3120 |
| 22 | 10110010_00111100 | 10011100_01111000 | 3120_1230 |
| 23 | 10111000_01010011 | 11011000_00100111 | 2130_0312 |
| 28 | 11100001_01001101 | 00011011_00011011 | 0132_0132 |

It can be learned from Table 3 that the eBCH code word corresponding to the first identifier is actually a part of code words in Table 2. Because a quantity of "0"s and a quantity of "1"s in first eight bits of the first identifier in Table 3 are the same, and a quantity of "0"s and a quantity of "1"s in last eight bits are the same, the first identifier in Table 3 satisfies DC balance in an NRZ modulation scheme. In addition, the code word in Table 3 uses PAM4 modulation, and four levels, namely, "0", "1", "2", and "3", appear evenly. Therefore, the first identifier in Table 3 can also satisfy DC balance in a PAM4 modulation scheme.

Although the first identifier itself can satisfy DC balance in the NRZ modulation scheme and the PAM4 modulation scheme, DC balance of a valid payload can be satisfied by scrambling the valid payload in the encoding unit. However, for a data stream, DC imbalance may still occur. In this case, in this embodiment of this application, a part of bits in the first identifier may be adjusted, to ensure DC balance on each data stream. For example, statistics on a DC imbalance degree of a data stream within a specific length range may be collected, and the DC imbalance degree within the length range is compensated by adjusting, for example, the last two bits in the first identifier, to satisfy DC balance on the data stream. For the receive end, the first identifier has a 3-bit error correction capability. Even if a part of bits of the first identifier for adjusting DC balance are incorrect, the receive end may perform error correction on the first identifier by using eBCH decoding, and identification of the first identifier is not affected.

S402: The transmit end distributes the M encoding units to N transmission channels, and the receive end receives the M encoding units from the N transmission channels.

After generating the M encoding units, the transmit end may distribute the M encoding units to the N transmission channels. Specifically, the transmit end may distribute the at least one first-type unit in polling mode to the N transmission channels at a fixed length.

In an example, it may be specified that a distribution sequence of a first identifier of one or a part of units in the at least one first-type unit is before a distribution sequence of a valid payload. To be specific, the transmit end may distribute the at least one first-type unit, based on a distribution sequence of the first identifier before a distribution sequence of the valid payload, to the N transmission channels in polling mode.

Because a part of bits of the first identifier may be used for adjusting DC balance of the data stream, the transmit end distributes the at least one first-type unit to the N transmission channels in polling mode when occurrence probabilities of first identifiers on all transmission channels are different. For example, if there is no first identifier on a transmission channel on the N transmission channels, when DC balance adjustment is performed on the data stream based on the first identifier, DC balance adjustment can be performed only on a part of transmission channels, and cannot be performed on all transmission channels. As a result, DC balance adjustment is affected. In this case, when at least one first-type unit is distributed in a next round, a distribution rule may be adjusted. For example, it may be specified that a polling sequence of a first identifier of another unit or some other units in the at least one first-type unit in the next round is after polling sequences of a part of valid payloads. That is, in different rounds, polling sequences of the first identifier may not be the same. In this way, occurrence probabilities of first identifiers on all transmission channels are the same, to ensure DC balance on each transmission channel, that is, to ensure DC balance on all the transmission channels.

It should be noted that distribution sequences of first identifiers of a plurality of first-type units in a round may be the same. This is simple. Certainly, distribution sequences of first identifiers of a plurality of first-type units in a round may alternatively be different. This is not limited in this embodiment of this application.

In another example, the N transmission channels may be grouped and bound. For example, the N transmission channels are grouped in a unit of a granularity of a transmission channel carrying the first identifier. For example, if a quantity of transmission channels carrying the first identifier is 2, two adjacent transmission channels are bound into one group, to obtain P transmission channel groups. Then, the M encoding units are distributed to the P transmission channel groups in a unit of a transmission channel group.

For example, it may be specified that a polling sequence of a transmission channel in the N transmission channels is before a polling sequence of another transmission channel in the N transmission channels, or it may be specified that a polling sequence of a part of transmission channels in the N transmission channels is before a polling sequence of other transmission channels in the N transmission channels. For ease of description, in the following, a transmission channel herein is referred to as a first transmission channel, and another transmission channel is referred to as a second transmission channel. Some transmission channels are referred to as a first transmission channel group, and other transmission channels are referred to as a second transmission channel group.

For example, it is specified that a polling sequence of a first transmission channel group in the P transmission channel groups is before a polling sequence of a second transmission channel group in the P transmission channel groups. That is, the transmit end may distribute the M encoding units in polling mode based on a sequence of the first transmission channel group before a sequence of the second transmission channel group. It should be understood that, the transmission channel group is bound by using a transmission channel carrying the first identifier as a granularity. Therefore, it may be specified that the transmit end distributes the M encoding units in polling mode based on a sequence of the first identifier before a sequence of the valid payload. In this case, the first transmission channel is a transmission channel carrying the first identifier.

It should be understood that, when lengths of encoding units are different, the M encoding units are polled based on a polling sequence of a first transmission channel group in the P transmission channel groups before a polling sequence of a second transmission channel group in the P transmission channel groups, and occurrence probabilities of first identifiers on all transmission channels are not necessarily the same. That is, there is always no first identifier on a part of transmission channel groups. Therefore, when DC balance adjustment is performed on the data stream based on the first identifier, DC balance adjustment can be performed only on a part of transmission channels, and cannot be performed on all the transmission channels. As a result, DC balance adjustment is affected.

Therefore, when the M encoding units are distributed, a distribution rule may be adjusted, that is, in different rounds, polling sequences of a same transmission channel group are different. For example, it may be specified that a polling sequence of a transmission channel group in a previous round is adjusted. For example, it may be specified that a polling sequence of a second transmission channel in the N transmission channels is before a polling sequence of a first transmission channel in the N transmission channels In this way, occurrence probabilities of first identifiers on all transmission channels are the same, to ensure DC balance on each transmission channel as much as possible, that is, to ensure DC balance on all the transmission channels.

For ease of description, it is assumed in the following that numbers of the P transmission channel groups are sequentially $N_k, N_{k+1}, \ldots,$ and $N_{k+P-1}$, and k is an integer greater than or equal to 0. For example, the first transmission channel group is a transmission channel group $N_k$, the second transmission channel group is a transmission channel group $N_{k+1}$, and the first transmission channel group and the second transmission channel group are two adjacent transmission channel groups. Certainly, the first transmission channel group and the second transmission channel group may alternatively not be adjacent to each other.

When distributing the M encoding units in an $i^{th}$ polling, the transmit end distributes the M encoding units, based on a polling sequence of the transmission channel group $N_k$ in the P transmission channel groups before a polling sequence of the transmission channel group $N_{k+1}$ in the P transmission channel groups, to the N transmission channels at a fixed length. Then, occurrence probabilities of first identifiers on all transmission channels are the same. Therefore, when distributing the M encoding units in an $(i+1)^{th}$ polling, the transmit end still distributes the M encoding units to the N transmission channels based on the polling sequence of the transmission channel group $N_k$ in the P transmission channel groups before the polling sequence of the transmission channel group $N_{k+1}$ in the P transmission channel groups. In different rounds, polling sequences of the N transmission channels are the same.

On the contrary, if occurrence probabilities of first identifiers on all transmission channels are different after the $i^{th}$ polling, when distributing the M encoding units in the $(i+1)^{th}$ polling, the transmit end distributes the M encoding units to the N transmission channels based on a polling sequence of the transmission channel group $N_{k+1}$ in the P transmission channel groups before a polling sequence of the transmission channel group $N_k$ in the P transmission channel groups. That is, in different rounds, polling sequences of the N transmission channels may be different, to ensure that occurrence probabilities of first identifiers on all transmission channels are the same, that is, to ensure DC balance of all the transmission channels.

The following uses an example in which the M encoding units are distributed to 16 transmission channels, 12 transmission channels, and eight transmission channels respectively to describe a distribution rule of distributing the M encoding units to the N transmission channels.

Example 1: FIG. 15 is a schematic diagram of distribution rules corresponding to 16 transmission channels. That is, N=16. ×16 in FIG. 15 represents 16 transmission channels, and the 16 transmission channels are sequentially numbered from 0 to 15. Two adjacent transmission channels of the 16 transmission channels form one transmission channel group, that is, a transmission channel 0 and a transmission channel 1 form one transmission channel group, a transmission channel 2 and a transmission channel 3 form one transmission channel group, and so on. There are eight transmission channel groups. The eight transmission channel groups are sequentially numbered from 0 to 7, and it may be specified that a polling sequence of an odd-numbered transmission channel group is before a polling sequence of an even-numbered transmission channel group. In FIG. 15, an example in which a length of an encoding unit is 68 bytes (byte) is used. To be specific, the transmit end distributes at least one first-type unit in polling mode to the 16 transmission channels based on a length of 68 bytes. The M encoding units may be sequentially distributed to the eight transmission channel groups based on a distribution sequence of a first identifier before a distribution sequence of data. After four distribution cycles, four encoding units can be completely distributed to the 16 transmission channels. That is, after one round, the four encoding units can be completely distributed to the 16 transmission channels, as shown in FIG. 15. In FIG. 15, a valid payload in a first round includes code blocks A0 to A65, B0 to B65, C0 to C65, and D0 to D65 in the first round. It can be learned from FIG. 15 that a polling sequence of one transmission channel group in two adjacent transmission channel groups is before a polling sequence of the other transmission channel group. For example, a polling sequence of an odd-numbered transmission channel group is before a polling sequence of an even-numbered transmission channel group. After a round of distribution, a first identifier A to a first identifier D are distributed on a transmission channel 0, a transmission channel 1, a transmission channel 4, a transmission channel 5, a transmission channel 8, a transmission channel 9, a transmission channel 12, and a transmission channel 13, and there is no first identifier on another transmission channel. If the distribution rule of the previous round is used when the encoding units are distributed in a next round, that is, when fifth to eighth encoding units are distributed, after the distribution, the first identifiers are still distributed on the transmission channel 0, the transmission channel 1, the transmission channel 4, the transmission channel 5, the transmission channel 8, the transmission channel 9, the transmission channel 12, and the transmission channel 13, and there is still no first identifier on another transmission channel. In this way, when DC balance adjustment is performed on the data stream based on the first identifier, DC balance adjustment can be performed only on a part of transmission channels, and cannot be performed on all transmission channels. As a result, DC balance adjustment is affected.

Therefore, when the fifth to eighth encoding units are distributed in the next round, the distribution rule may be adjusted. In this way, occurrence probabilities of first identifiers on all transmission channels are the same, to satisfy DC balance on all the transmission channels. For example, it may be specified that a polling sequence of the even-numbered transmission channel group is before a polling sequence of the odd-numbered transmission channel group. That is, when the fifth to eighth encoding units are distributed in a second round, data may be distributed before the first identifier. That is, a polling sequence of the first identifier is after polling sequences of a part of valid payloads. For example, data of the transmission channel 0 and the transmission channel 1 is exchanged with data of the transmission channel 2 and the transmission channel 3, as shown in FIG. 15. In this way, the fifth to eighth encoding units are distributed, and a first identifier E to a first identifier H are distributed on the transmission channel 2, the transmission channel 3, the transmission channel 6, the transmission channel 7, the transmission channel 10, the transmission channel 11, the transmission channel 14, and the transmission channel 15. After two rounds of distribution, quantities of first identifiers on all transmission channels are the same. By analogy, a distribution rule of the encoding unit in a third round is the same as the distribution rule in the first round, and a distribution rule of the encoding unit in a fourth round is the same as the distribution rule in the second round. In this case, occurrence probabilities of first identifiers on all transmission channels are the same.

Because a transmission channel group is a unit, adjusting a polling sequence of a transmission channel group is adjusting a polling sequence of a payload carried in the transmission channel group. That is, in each polling cycle, each transmission channel corresponds to a payload at a fixed location in the encoding unit, as shown in FIG. 15. Numbers of valid payloads carried on the transmission channel 0 on which a first identifier A to a first identifier I are located are all 14, 30, 46, and 62, or numbers of valid payloads carried on the transmission channel 0 on which a first identifier A to a first identifier I are located are all 15, 31, 47, and 63. In each polling cycle, each transmission channel corresponds to a payload at a fixed location in the encoding unit. This facilitates decoding at the receive end and can reduce implementation complexity at the receive end.

Example 2: FIG. 16 is a schematic diagram of distribution rules corresponding to 12 transmission channels. That is, N=12, ×12 in FIG. 16 represents 12 transmission channels, and the 12 transmission channels are sequentially numbered from 0 to 11. Two adjacent transmission channels of the 12 transmission channels form one transmission channel group, that is, a transmission channel 0 and a transmission channel 1 form one transmission channel group, a transmission channel 2 and a transmission channel 3 form one transmission channel group, and so on. There are six transmission channel groups. The six transmission channel groups are sequentially numbered from 0 to 5, and it may be specified that a polling sequence of an odd-numbered transmission channel group is before a polling sequence of an even-numbered transmission channel group. In FIG. 16, an example in which a length of an encoding unit is 68 bytes (byte) is used. To be specific, a transmit end distributes at least one first-type unit in polling mode to the 12 transmission channels based on a length of 68 bytes. Similar to Example 1, M encoding units may be sequentially distributed to the six transmission channel groups based on a distribution sequence of a first identifier before a distribution sequence of data. After three distribution cycles (that is, after one round), three encoding units can be completely distributed to the 12 transmission channels, as shown in FIG. 16. In FIG. 16, a valid payload in a first round includes code blocks A0 to A65, B0 to B65, and C0 to C65 in the first round. It can be learned from FIG. 16 that a polling sequence of the first identifier in the three encoding units is before a polling sequence of the valid payload in the three encoding units. After a round of distribution, a first identifier A to a first identifier C are distributed on a transmission channel 0, a transmission channel 1, a transmission channel 4, a transmission channel 5, a transmission channel 8, and a transmission channel 9, and there is no first identifier on another transmission channel. If the distribution rule of the previous round is used when fourth to sixth encoding units are distributed in a next round, after the distribution, the first identifiers are still distributed on the transmission channel 0, the transmission channel 1, the transmission channel 4, the transmission channel 5, the transmission channel 8, the transmission channel 9, and there is still no first identifier on another transmission channel.

Therefore, when the fourth to sixth encoding units are distributed in the next round, the distribution rule may be adjusted. In this way, occurrence probabilities of first identifiers on all transmission channels are the same, to satisfy DC balance on all the transmission channels. For example, it may be specified that a polling sequence of the even-numbered transmission channel group is before a polling sequence of the odd-numbered transmission channel group. That is, when the fourth to sixth encoding units are distributed in a second round, data may be distributed before the first identifier. That is, a polling sequence of the first identifier is after polling sequences of a part of valid payloads. For example, data of the transmission channel 0 and the transmission channel 1 is exchanged with data of the transmission channel 2 and the transmission channel 3, as shown in FIG. 16. In this way, the fourth to sixth encoding units are distributed, and a first identifier D to a first identifier F are distributed on the transmission channel 2, the transmission channel 3, the transmission channel 6, the transmission channel 7, the transmission channel 10, and the transmission channel 11. After two rounds of distribution, quantities of first identifiers on all transmission channels are the same. By analogy, a distribution rule of the encoding unit in a third round is the same as the distribution rule in the first round, and a distribution rule of the encoding unit in a fourth round is the same as the distribution rule in the second round. In this case, occurrence probabilities of first identifiers on all transmission channels are the same.

Same as Example 1, it can be learned from FIG. 16 that, numbers of valid payloads carried on the transmission channel 0 on which a first identifier A to a first identifier I are located are all 10, 22, 34, and 46, or numbers of valid payloads carried on the transmission channel 0 on which a first identifier A to a first identifier I are located are all 11, 23, 35, and 47. That is, in each polling cycle, each transmission channel corresponds to a payload at a fixed location in the encoding unit. This facilitates implementation at the receive end.

Figure 21:
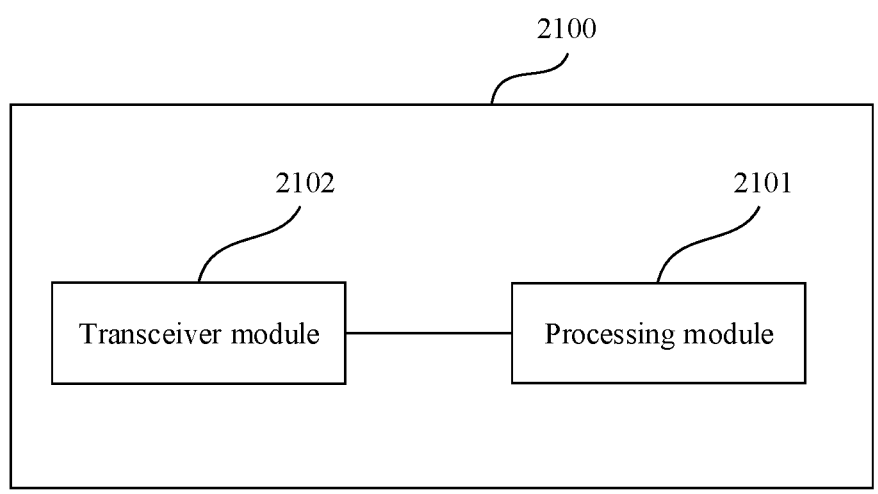
FIG. 21 is a schematic diagram of another structure of a communication apparatus according to an embodiment of this application.

Example 3: FIG. 17 is a schematic diagram of distribution rules corresponding to eight transmission channels. That is, N=8, and ×8 in FIG. 17 represents eight transmission channels, and the eight transmission channels are sequentially numbered from 0 to 7. Two adjacent transmission channels of the eight transmission channels form one transmission channel group, that is, a transmission channel 0 and a transmission channel 1 form one transmission channel group, a transmission channel 2 and a transmission channel 3 form one transmission channel group, and so on. There are four transmission channel groups. The four transmission channel groups are sequentially numbered from 0 to 3, and it may be specified that a polling sequence of an odd-numbered transmission channel group is before a polling sequence of an even-numbered transmission channel group. In FIG. 17, an example in which a length of an encoding unit is 68 bytes (byte) is used. To be specific, a transmit end distributes at least one first-type unit to the eight transmission channels based on a length of 68 bytes. Similar to Example 1, M encoding units may be sequentially distributed to the eight transmission channels based on a distribution sequence of a first identifier before a distribution sequence of data. After two distribution cycles (that is, after one round), two encoding units can be completely distributed to the eight transmission channels, as shown in FIG. 21.

In FIG. 17, a valid payload in a first round includes code blocks A0 to A65 and B0 to B65 in the first round. It can be learned from FIG. 17 that a polling sequence of the first identifier in the two encoding units is before a polling sequence of the valid payload. After a round of distribution, a first identifier A and a first identifier B are distributed on a transmission channel 0, a transmission channel 1, a transmission channel 4, and a transmission channel 5, and there is no first identifier on another transmission channel. If the distribution rule of the previous round is used when third and fourth encoding units are distributed in a next round, after the distribution, the first identifiers are still distributed on the transmission channel 0, the transmission channel 1, the transmission channel 4, and the transmission channel 5, and there is still no first identifier on another transmission channel.

Therefore, when the third and fourth encoding units are distributed in the next round, the distribution rule may be adjusted. In this way, occurrence probabilities of first identifiers on all transmission channels are the same, to satisfy DC balance on all the transmission channels. For example, it may be specified that a polling sequence of the even-numbered transmission channel group is before a polling sequence of the odd-numbered transmission channel group. That is, when the third and fourth encoding units are distributed in a second round, data may be distributed before the first identifier. That is, a polling sequence of the first identifier is after polling sequences of a part of valid payloads. For example, data of the transmission channel 0 and the transmission channel 1 is exchanged with data of the transmission channel 2 and the transmission channel 3, as shown in FIG. 17. In this way, the third and fourth encoding units are distributed, and a first identifier C and a first identifier D are distributed on the transmission channel 2, the transmission channel 3, the transmission channel 6, and the transmission channel 7. After two rounds of distribution, quantities of first identifiers on all transmission channels are the same. By analogy, a distribution rule of the encoding unit in a third round is the same as the distribution rule in the first round, and a distribution rule of the encoding unit in a fourth round is the same as the distribution rule in the second round. In this case, occurrence probabilities of first identifiers on all transmission channels are the same.

Certainly, if the transmit end distributes the at least one first-type unit in polling mode to the N transmission channels at a fixed length, and occurrence probabilities of first identifiers on all transmission channels are the same, the distribution rule may not be adjusted in a process of distributing the M encoding units. Similar to Example 1, in each polling cycle, each transmission channel corresponds to a payload at a fixed location in the encoding unit. This facilitates implementation at the receive end.

Example 4: FIG. 18 is a schematic diagram of distribution rules corresponding to 16 transmission channels. That is, N=16. ×16 in FIG. 18 represents 16 transmission channels, and the 16 transmission channels are sequentially numbered from 0 to 15. Two adjacent transmission channels of the 16 transmission channels form one transmission channel group, that is, a transmission channel 0 and a transmission channel 1 form one transmission channel group, a transmission channel 2 and a transmission channel 3 form one transmission channel group, and so on. There are eight transmission channel groups. The eight transmission channel groups are sequentially numbered from 0 to 7, and it may be specified that a polling sequence of an odd-numbered transmission channel group is before a polling sequence of an even-numbered transmission channel group. In FIG. 18, an example in which a length of an encoding unit is 66 bytes (byte) is used. To be specific, a transmit end distributes at least one first-type unit in polling mode to the 16 transmission channels based on a length of 66 bytes. M encoding units may be sequentially distributed to the 16 transmission channels based on a distribution sequence of a first identifier before a distribution sequence of data. After eight distribution cycles, eight encoding units can be completely distributed to the 16 transmission channels. That is, after one round, the eight encoding units can be completely distributed to the 16 transmission channels, as shown in FIG. 18. It can be learned from FIG. 18 that after one round of distribution is performed on the eight encoding units, first identifiers are evenly distributed on the transmission channel 0 to the transmission channel 15. If the distribution rule of the previous round is used when the encoding units are distributed in a next round, that is, when ninth to sixteenth encoding units are distributed, after the distribution, first identifiers are still evenly distributed on the transmission channel 0 to the transmission channel 15. In this way, when the ninth to sixteenth encoding units are distributed in the next round, the distribution rule may not be adjusted. Similar to Example 1, in each polling cycle, each transmission channel corresponds to a payload at a fixed location in the encoding unit. This facilitates implementation at the receive end.

Example 5: FIG. 19 is a schematic diagram of distribution rules corresponding to 16 transmission channels. That is, N=12, ×12 in FIG. 19 represents 12 transmission channels, and the 12 transmission channels are sequentially numbered from 0 to 11. Two adjacent transmission channels of the 12 transmission channels form one transmission channel group, that is, a transmission channel 0 and a transmission channel 1 form one transmission channel group, a transmission channel 2 and a transmission channel 3 form one transmission channel group, and so on. There are six transmission channel groups. The six transmission channel groups are sequentially numbered from 0 to 5, and it may be specified that a polling sequence of an odd-numbered transmission channel group is before a polling sequence of an even-numbered transmission channel group. In FIG. 19, an example in which a length of an encoding unit is 82 bytes (byte) is used. To be specific, a transmit end distributes at least one first-type unit in polling mode to the 12 transmission channels based on a length of 82 bytes. M encoding units may be sequentially distributed to the 12 transmission channels based on a distribution sequence of a first identifier before a distribution sequence of data. It can be learned from FIG. 19 that after one round of distribution is performed on the six encoding units, first identifiers are evenly distributed on the transmission channel 0 to the transmission channel 11. If the distribution rule of the previous round is used when the encoding units are distributed in a next round, that is, when seventh to twelfth encoding units are distributed, after the distribution, first identifiers are still evenly distributed on the transmission channel 0 to the transmission channel 11. In this way, when the seventh to twelfth encoding units are distributed in the next round, the distribution rule may not be adjusted. Similar to Example 1, in each polling cycle, each transmission channel corresponds to a payload at a fixed location in the encoding unit. This facilitates implementation at the receive end.

It should be noted that, in the foregoing Example 1 to Example 5, an example in which polling sequences of the N transmission channels in a round are the same is used. This is not limited in this embodiment of this application. For example, polling sequences of different transmission channel groups in the N transmission channels in a round may be different when occurrence probabilities of first identifiers on all transmission channels are the same after a plurality of rounds of distribution.

In Example 1 to Example 5, an example in which one transmission channel carries an 8-bit payload is used. In this case, the first identifier, that is, 16 bits, is carried on two transmission channels. It may be considered that one of the two transmission channels may carry first eight bits of the 16 bits, and the other transmission channel carries last eight bits of the 16 bits. A quantity of "0"s and "1"s in the first eight bits of the 16 bits is the same as that in the last eight bits of the 16 bits. Therefore, DC balance on each transmission channel can be ensured. If PAM4 modulation is used, quantities of "0", "1", "2", and "3" corresponding to the first eight bits in the 16 bits are even, and quantities of "0", "1", "2", and "3" corresponding to the last eight bits are also even, that is, DC balance on each transmission channel is ensured.

S403: The receive end decodes the M encoding units based on the first identifier included in the at least one first-type unit, to obtain the L frames.

The receive end receives the M encoding units from the N transmission channels. It should be understood that a receiving rule for receiving the M encoding units by the receive end from the N transmission channels corresponds to a distribution rule for distributing the M encoding units by the transmit end. For example, the transmit end distributes the at least one first-type unit in polling mode based on a length of Example 1 to Example 3, that is, a length of 68 bytes, and the receive end receives the at least one first-type unit from the N transmission channels based on the length of 68 bytes. In addition, the receive end may determine, based on a distribution rule of each round, a transmission channel on which the first identifier is located in each round, to determine a location of the first identifier, and decode the received encoding unit based on the first identifier, to obtain the L frames.

According to the data encoding method provided in this embodiment of this application, before data is encoded, the first identifier used for identifying the start location of the frame header of each of the L frames is inserted. In this way, the receive end can delimit each frame. In addition, because insertion of the first identifier may control a quantity of consecutive "0"s and consecutive "1"s in the entire data stream, direct current baseline drift is avoided, and the receive end correctly parses each frame. Because the first identifier may be generated by using an error correction and detection code word, the first identifier is protected, and there is no need to additionally set check information for protecting the first identifier, to reduce encoding overheads. In addition, the first identifier itself can satisfy DC balance. Even if a valid payload in an encoding unit is scrambled, DC balance can still be satisfied for the entire encoding unit, to ensure DC balance in a PAM4 modulation scheme and an NRZ modulation scheme. In addition, because the first identifier is generated by using an error correction and detection code word. In this case, the first identifier itself has an error correction capability. Even if a part of bits of the first identifier are adjusted, the receive end may perform error correction on the first identifier, and identification of the first identifier is not affected. Therefore, DC balance of any data stream within a specific length range may be ensured by adjusting a part of bits of the first identifier.

In the foregoing embodiments provided in this application, the methods provided in embodiments of this application are separately described from a perspective of interaction between a transmit end and a receive end. To implement functions in the method provided in the foregoing embodiments of this application, the transmit end and the receive end may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

The following describes communication apparatuses for implementing the foregoing methods in embodiments of this application with reference to the accompanying drawings. Therefore, all the foregoing content may be used in the following embodiments. Repeated content is not described again.

Figure 20:
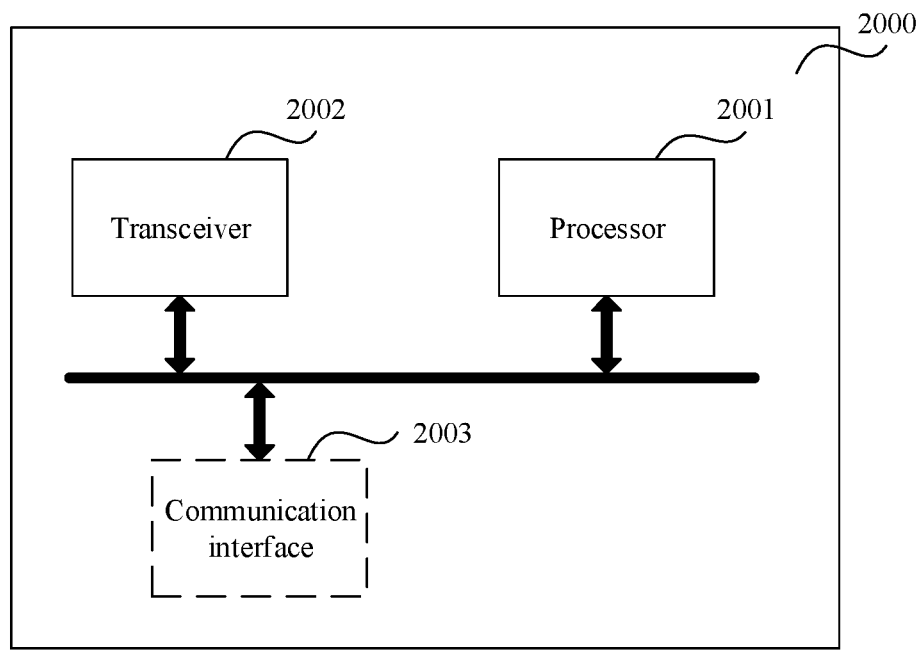
FIG. 20 is a schematic diagram of a structure of a communication apparatus according to an embodiment of this application.

FIG. 20 is a schematic diagram of a structure of a communication apparatus 2000 according to an embodiment of this application. The communication apparatus 2000 may correspondingly implement functions or steps implemented by the transmit end or the receive end in the foregoing method embodiments. The communication apparatus may be a network device (for example, a switch), or may be a chip or a circuit, for example, a chip or a circuit that may be disposed in a network device. The communication apparatus 2000 may include a processor 2001 and a transceiver 2002. The processor 2001 and the transceiver 2002 may be connected through a bus system. Optionally, the communication apparatus may further include a memory. The storage unit may be configured to store instructions (code or a program) and/or data. The transceiver 2002 and the processor 2001 may be coupled to the storage unit. For example, the processor 2001 may read instructions (code or a program) and/or data in the storage unit, to implement a corresponding method. The foregoing units may be independently disposed, or may be partially or completely integrated. For example, the transceiver 2002 may include a transmitter and a receiver that are independently disposed. Optionally, the transceiver 2002 may alternatively be a communication interface 2003, or the transceiver 2002 may further include a communication interface 2003. The communication interface 2003 is configured to input and/or output information. The processor 2001 is configured to execute a computer program or instructions, so that the communication apparatus 2000 implements the method at the transmit end or the receive end in the related solution in FIG. 4. Because the communication interface 2003 is optional, a dashed line is used for illustration in FIG. 20.

It should be understood that the processor 2001 may be a chip. For example, the processor may be a field programmable gate array (field programmable gate array, FPGA), an application-specific integrated circuit (application specific integrated circuit, ASIC), a system on a chip (system on chip, SoC), a central processing unit (central processor unit, CPU), a network processor (network processor, NP), a digital signal processing circuit (digital signal processor, DSP), a micro controller unit (micro controller unit, MCU), a programmable logic device (programmable logic device, PLD), or another integrated chip.

In an implementation process, steps in the foregoing methods can be implemented by using a hardware integrated logical circuit in the processor, or by using instructions in a form of software. The steps of the methods disclosed with reference to embodiments of this application may be directly performed and completed by a hardware processor, or may be performed and completed by using a combination of hardware and software modules in the processor. The software module may be located in a mature storage medium in the art, for example, a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It should be noted that the processor 2001 in this embodiment of this application may be an integrated circuit chip and has a signal processing capability. In an implementation process, the steps in the foregoing method embodiments can be implemented by a hardware integrated logical circuit in the processor, or by using instructions in a form of software. The processor may be a general-purpose processor, a digital signal processor (DSP), an application specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and completed by a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example, and not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the method described in this specification is intended to include, but not limited to, these memories and any memory of another proper type.

In some embodiments, the communication apparatus 2000 can correspondingly implement behavior and functions of the transmit end in the foregoing method embodiments. For example, the communication apparatus 2000 may be a transmit end, or may be a component (for example, a chip or a circuit) applied to the transmit end. The communication apparatus 2000 may include a processor 2001 and a transceiver 2002. The transceiver 2002 may be configured to perform all receiving or sending operations performed by the transmit end in the embodiment shown in FIG. 4, for example, S402 in the embodiment shown in FIG. 4, and/or configured to support another process of the technology described in this specification. The processor 2001 is configured to perform an operation, other than all receiving or sending operations, performed by the transmit end in the embodiment shown in FIG. 4, for example, S401 in the embodiment shown in FIG. 4, and/or configured to support another process of the technology described in this specification.

For example, the processor 2001 is configured to generate M encoding units. The M encoding units are obtained by encoding L frames. The M encoding units include at least one first-type unit. The first-type unit includes a first identifier. The first identifier indicates a start location that is in the first-type unit and that is of a frame header of a first frame in the L frames. M is an integer greater than or equal to 1, and L is an integer greater than or equal to 1.

The processor 2001 is configured to distribute the M encoding units to N transmission channels. N is an integer greater than or equal to 1.

In an optional implementation, the first-type unit includes a first field and a second field. The first field is used for carrying the first identifier. The second field is used for carrying a part or all of data in one or more of the L frames.

In an optional implementation, the first-type unit further includes a third field. The third field is used for carrying check information for checking the first-type unit.

In an optional implementation, the M encoding units further include at least one second-type unit. The second-type unit includes a second field. Data carried in a first unit belongs to a frame corresponding to a first identifier in a second unit. The first unit is one of the at least one second-type unit. The second unit is one of the at least one first-type unit. The first identifier in the second unit is a first identifier preceding the first unit.

In an optional implementation, the second field includes K subfields. The K subfields each occupy a same quantity of bits, or at least two of the K subfields occupy different quantities of bits.

In an optional implementation, the start location of the frame header of the first frame is a start location of a first subfield in the K subfields.

In an optional implementation, the first identifier includes X bits, and the X bits satisfy direct current balance in a PAM4 modulation scheme.

In an optional implementation, the X bits further satisfy direct current balance in an NRZ modulation scheme.

In an optional implementation, X is equal to 16, and the first identifier includes 1110010011100100, 0010011111011000, 0110001110000111, 1000011101100011, 0111100010011100, 1001110001111000, 1101100000100111, or 0001101100011011.

In an optional implementation, the X bits are obtained by adjusting a bit sequence of an eBCH code word according to a preset rule.

In an optional implementation, the at least one first-type unit is distributed in polling mode to the N transmission channels at a fixed length.

For example, a distribution sequence of a first identifier of a third unit in the at least one first-type unit is before a distribution sequence of a valid payload.

Further, a distribution sequence of a first identifier of a fourth unit in the at least one first-type unit is after distribution sequences of a part of valid payloads.

For another example, the N transmission channels include P transmission channel groups, and in a first round, a polling sequence of a first transmission channel group in the P transmission channel groups is before a polling sequence of a second transmission channel group in the P transmission channel groups.

Further, in a second round, a polling sequence of the first transmission channel group is after a polling sequence of the second transmission channel group.

In an optional implementation, before sending the M encoding units, the transceiver 2002 is further configured to:

for any one of the N transmission channels, adjust a part of bits of one or more first identifiers of the transmission channel based on a direct current balance status of the transmission channel.

In some embodiments, the communication apparatus 2000 can correspondingly implement behavior and functions of the receive end in the foregoing method embodiments. For example, the communication apparatus 2000 may be a receive end, or may be a component (for example, a chip or a circuit) applied to the receive end. The communication apparatus 2000 may include a processor 2001 and a transceiver 2002. The transceiver 2002 may be configured to perform all receiving or sending operations performed by the transmit end in the embodiment shown in FIG. 4, for example, S402 in the embodiment shown in FIG. 4, and/or configured to support another process of the technology described in this specification. The processor 2001 is configured to perform an operation, other than all receiving or sending operations, performed by the transmit end in the embodiment shown in FIG. 4, for example, S403 in the embodiment shown in FIG. 4, and/or configured to support another process of the technology described in this specification.

For example, the transceiver 2002 is configured to receive M encoding units from N transmission channels. The M encoding units are obtained by encoding L frames. The M encoding units include at least one first-type unit. The first-type unit includes a first identifier. The first identifier indicates a location that is in the first-type unit and that is of a frame header of a first frame in the L frames. M is an integer greater than or equal to 1, L is an integer greater than or equal to 1, and N is an integer greater than or equal to 1.

The processor 2001 is configured to decode the M encoding units based on at least one first identifier, to obtain the L frames.

In an optional implementation, the first-type unit includes a first field and a second field. The first field is used for carrying the first identifier. The second field is used for carrying a part or all of data in one or more of the L frames.

In an optional implementation, the first-type unit further includes a third field. The third field is used for carrying check information for checking the first-type unit.

In an optional implementation, the M encoding units further include at least one second-type unit. The second-type unit includes a second field. Data carried in a first unit belongs to a frame corresponding to a first identifier in a second unit. The first unit is one of the at least one second-type unit. The second unit is one of the at least one first-type unit. The first identifier in the second unit is a first identifier preceding the first unit.

In an optional implementation, the second field includes K subfields. The K subfields each occupy a same quantity of bits, or at least two of the K subfields occupy different quantities of bits.

In an optional implementation, the start location of the frame header of the first frame is a start location of a first subfield in the K subfields.

In an optional implementation, the first identifier includes X bits, and the X bits satisfy direct current balance in a PAM4 modulation scheme.

In an optional implementation, the X bits further satisfy direct current balance in an NRZ modulation scheme.

In an optional implementation, X is equal to 16, and the first identifier includes 1110010011100100, 0010011111011000, 0110001110000111, 1000011101100011, 0111100010011100, 1001110001111000, 1101100000100111, or 0001101100011011.

In an optional implementation, the X bits are obtained by adjusting a bit sequence of an eBCH code word according to a preset rule.

In an optional implementation, the transceiver 2002 is specifically configured to receive the M encoding units from the N transmission channels at a fixed length.

For example, a distribution sequence of a first identifier of a third unit in the at least one first-type unit is before a distribution sequence of a valid payload.

Further, a distribution sequence of a first identifier of a fourth unit in the at least one first-type unit is after distribution sequences of a part of valid payloads.

For another example, in a first round, the N transmission channels include P transmission channel groups, and a polling sequence of a first transmission channel group in the P transmission channel groups is before a polling sequence of a second transmission channel group in the P transmission channel groups.

Further, in a second round, a polling sequence of the first transmission channel group is after a polling sequence of the second transmission channel group.

For concepts, explanations, detailed descriptions, and other steps of the communication apparatus 2000 that are related to the technical solutions provided in this embodiment of this application, refer to the descriptions of the content in the foregoing method embodiments or other embodiments. Details are not described herein again.

FIG. 21 is a schematic diagram of another structure of a communication apparatus according to an embodiment of this application. As shown in FIG. 21, a communication apparatus 2100 may include a processing module 2101 and a transceiver module 2102. It should be understood that unit division of the communication apparatus 2100 is merely logical function division. In actual implementation, all or a part of the units may be integrated into one physical entity, or may be physically separated. In this embodiment of this application, the transceiver module 2102 may be implemented by the transceiver 2002 in FIG. 20, and the processing module 2101 may be implemented by the processor 2001 in FIG. 20.

The communication apparatus 2100 can correspondingly implement the steps performed on the transmit side and/or the receive side in the foregoing method embodiments. For example, the communication apparatus 2100 may be a transmit end, or may be a component (for example, a chip or a circuit) applied to the transmit end.

In some embodiments, the processing module 2101 is configured to generate M encoding units. The M encoding units are obtained by encoding L frames. The M encoding units include at least one first-type unit. The first-type unit includes a first identifier. The first identifier indicates a start location that is in the first-type unit and that is of a frame header of a first frame in the L frames. M is an integer greater than or equal to 1, and L is an integer greater than or equal to 1.

The transceiver module 2102 is configured to distribute the M encoding units to N transmission channels. N is an integer greater than or equal to 1.

For concepts, explanations, detailed descriptions, and other steps of the communication apparatus 2100 that are related to the technical solutions provided in embodiments of this application, refer to the descriptions of the content in the foregoing methods or other embodiments. Details are not described herein again. It may be understood that for functions of the modules in the communication apparatus 2100, refer to implementation of a corresponding method embodiment. Details are not described herein again.

For another example, the communication apparatus 2100 can correspondingly implement behavior and functions of the receive end in the foregoing method embodiments. For example, the communication apparatus 2100 may be a receive end, or may be a component (for example, a chip or a circuit) applied to the receive end.

In some embodiments, the transceiver module 2102 is configured to receive M encoding units from N transmission channels. The M encoding units are obtained by encoding L frames. The M encoding units include at least one first-type unit. The first-type unit includes a first identifier. The first identifier indicates a location that is in the first-type unit and that is of a frame header of a first frame in the L frames. M is an integer greater than or equal to 1, L is an integer greater than or equal to 1, and N is an integer greater than or equal to 1.

The processing module 2101 is configured to decode the M encoding units based on at least one first identifier, to obtain the L frames.

For concepts, explanations, detailed descriptions, and other steps of the communication apparatus 2100 that are related to the technical solutions provided in embodiments of this application, refer to the descriptions of the content in the foregoing methods or other embodiments. Details are not described herein again. It may be understood that for functions of the modules in the communication apparatus 2100, refer to implementation of a corresponding method embodiment. Details are not described herein again.

It should be understood that the foregoing module division of the communication apparatus 2100 is merely logical function division. In actual implementation, all or a part of the modules may be integrated into one physical entity, or may be physically separated. In this embodiment of this application, the transceiver module 2102 may be implemented by the transceiver 2002 in FIG. 20, and the processing module 2101 may be implemented by the processor 2001 in FIG. 20.

An embodiment of this application further provides a communication system, including the foregoing communication apparatus configured to perform a solution on a transmit side and the foregoing communication apparatus configured to perform a solution on a receive side, or may further include more communication apparatuses on a transmit side or a receive side.

It should be understood that the communication apparatus may be a chip. The processor may be implemented by hardware, or may be implemented by software. When the processor is implemented by the hardware, the processor may be a logic circuit, an integrated circuit, or the like.

When the processor is implemented by the software, the processor may be a general-purpose processor. The general-purpose processor is implemented by reading software code stored in a memory. The memory may be integrated into the processor, or may be located outside the processor and exist independently.

This application further provides a computer program product. The computer program product includes computer program code. When the computer program code is run on a computer, the computer is enabled to perform the method in any one of the embodiments shown in FIG. 4.

According to the method provided in embodiments of this application, this application further provides a computer-readable storage medium. The computer-readable medium stores program code. When the program code is run on a computer, the computer is enabled to perform the method in any one of the embodiments shown in FIG. 4.

It should be understood that the terms "system" and "network" may be used interchangeably in embodiments of this application. "At least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, first information and second information are merely used to distinguish between different indication information, and do not indicate different priorities, importance, or the like of the two types of information.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

In addition, the term "for example" in embodiments of this application is used to represent an example or a description. Any embodiment or implementation solution described as an "example" in embodiments of this application should not be explained as being more preferred than another embodiment or implementation solution. That is, using the word "example" is intended to describe a concept in a specific manner.

All or some of the methods in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

In addition, the term "for example" in embodiments of this application is used to represent an example or a description. Any embodiment or implementation solution described as an "example" in embodiments of this application should not be explained as being more preferred than another embodiment or implementation solution. That is, using the word "example" is intended to describe a concept in a specific manner.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data encoding method, comprising:
generating M encoding units, wherein the M encoding units are obtained by encoding L frames, the M encoding units comprise at least one first-type unit, a first-type unit of the at least one first-type unit comprises a first identifier, the first identifier indicates a start location that is in the first-type unit and that is of a frame header of a first frame in the L frames, M is an integer greater than or equal to 1, and L is an integer greater than or equal to 1, wherein the first identifier comprises X bits, the X bits satisfy direct current balance in a four-level pulse amplitude modulation (PAM4) modulation scheme, the X bits satisfy direct current balance in a non-return-to-zero (NRZ) modulation scheme, or the X bits satisfy direct current balance in the PAM4 modulation scheme and the NRZ modulation scheme; and
distributing the M encoding units to N transmission channels, wherein N is an integer greater than or equal to 1.

2. The data encoding method according to claim 1, wherein the first-type unit comprises a first field and a second field, the first field is used for carrying the first identifier, and the second field is used for carrying a part or all of data in one or more of the L frames.

3. The data encoding method according to claim 2, wherein the first-type unit further comprises a third field, and the third field is used for carrying check information for checking the first-type unit.

4. The data encoding method according to claim 2, wherein the M encoding units further comprise at least one second-type unit, a second-type unit of the at least one second-type unit comprises a third field, data carried in a first unit belongs to a frame corresponding to a second identifier in a second unit, the first unit is one of the at least one second-type unit, the second unit is one of the at least one first-type unit, and the second unit is a first-type unit preceding the first unit.

5. The data encoding method according to claim 2, wherein the second field comprises K subfields, K is an integer greater than or equal to 1, and (1) the K subfields each occupy a same quantity of bits or (2) at least two of the K subfields occupy different quantities of bits.

6. The data encoding method according to claim 5, wherein the start location that is in the first-type unit and that is of the frame header of the first frame is a start location of a first subfield in the K subfields.

7. The data encoding method according to claim 1, wherein X is equal to 16, and the first identifier comprises 1110010011100100, 0010011111011000, 0110001110000111, 1000011101100011, 0111100010011100, 1001110001111000, 1101100000100111, or 0001101100011011.

8. A data decoding method, comprising:
receiving M encoding units from N transmission channels, wherein the M encoding units are obtained by encoding L frames, the M encoding units comprise at least one first-type unit, a first-type unit of the at least one first-type unit comprises a first identifier, the first identifier indicates a location that is in the first-type unit and that is of a frame header of a first frame in the L frames, M is an integer greater than or equal to 1, L is an integer greater than or equal to 1, and N is an integer greater than or equal to 1, wherein the first identifier comprises X bits, the X bits satisfy direct current balance in a four-level pulse amplitude modulation (PAM4) modulation scheme, the X bits satisfy direct current balance in a non-return-to-zero (NRZ) modulation scheme, or the X bits satisfy direct current balance in the PAM4 modulation scheme and the NRZ modulation scheme; and
decoding the M encoding units based on at least one first identifier, to obtain the L frames, wherein the at least one first identifier comprises the first identifier.

9. The data decoding method according to claim 8, wherein the first-type unit comprises a first field and a second field, the first field is used for carrying the first identifier, and the second field is used for carrying a part or all of data in one or more of the L frames.

10. The data decoding method according to claim 9, wherein the first-type unit further comprises a third field, and the third field is used for carrying check information for checking the first-type unit.

11. The data decoding method according to claim 9, wherein the M encoding units further comprise at least one second-type unit, a second-type unit of the at least one second-type unit comprises a third field, data carried in a first unit belongs to a frame corresponding to a second identifier in a second unit, the at least one first identifier comprises the second identifier in the second unit, the first unit is one of the at least one second-type unit, the second unit is one of the at least one first-type unit, and the second unit is a first-type unit preceding the first unit.

12. The data decoding method according to claim 9, wherein the second field comprises K subfields, K is an integer greater than or equal to 1, and (1) the K subfields each occupy a same quantity of bits or (2) at least two of the K subfields occupy different quantities of bits.

13. The data decoding method according to claim 12, wherein a start location of the frame header of the first frame is a start location of a first subfield in the K subfields.

14. The data decoding method according to claim 8, wherein X is equal to 16, and the first identifier in the first-type unit comprises 1110010011100100, 0010011111011000, 0110001110000111, 1000011101100011, 0111100010011100, 1001110001111000, 1101100000100111, or 0001101100011011.

15. The data decoding method according to claim 8, wherein the M encoding units are received in polling mode from the N transmission channels at a fixed length.

16. A communication apparatus, comprising at least one processor, at least one memory coupled to the at least one processor, and a transceiver, wherein:
the at least one memory stores program instructions that when executed by the at least one processor, cause the communication apparatus to generate M encoding units, wherein the M encoding units are obtained by encoding L frames, the M encoding units comprise at least one first-type unit, a first-type unit of the at least one first-type unit comprises a first identifier, the first identifier indicates a start location that is in the first-type unit and that is of a frame header of a first frame in the L frames, M is an integer greater than or equal to 1, and L is an integer greater than or equal to 1, wherein the first identifier comprises X bits, the X bits satisfy direct current balance in a four-level pulse amplitude modulation (PAM4) modulation scheme, the X bits satisfy direct current balance in a non-return-to-zero (NRZ) modulation scheme, or the X bits satisfy direct current balance in the PAM4 modulation scheme and the NRZ modulation scheme; and
the transceiver is configured to distribute the M encoding units to N transmission channels, wherein N is an integer greater than or equal to 1.

* * * * *

UNITED STATES PATENT AND TRADEMARK OFFICE
CERTIFICATE OF CORRECTION

| | |
|---|---|
| PATENT NO. | : 12,237,954 B2 |
| APPLICATION NO. | : 18/188251 |
| DATED | : February 25, 2025 |
| INVENTOR(S) | : Yuchun Lu, Lin Ma and Liang Li |

It is certified that error appears in the above-identified patent and that said Letters Patent is hereby corrected as shown below:

In the Claims

In Column 40, In Line 53, In Claim 1, delete "Lis" and insert -- L is --.

In Column 42, In Line 55 (Approx.), In Claim 16, delete "Nis" and insert -- N is --.

Signed and Sealed this
Twenty-second Day of July, 2025

Coke Morgan Stewart
*Acting Director of the United States Patent and Trademark Office*